(12) United States Patent
Hill

(10) Patent No.: US 11,321,747 B1
(45) Date of Patent: May 3, 2022

(54) METHODS AND SYSTEMS FOR ACTIVITY DONATION

(71) Applicant: Benjamin R. Hill, Leominster, MA (US)

(72) Inventor: Benjamin R. Hill, Leominster, MA (US)

( * ) Notice: Subject to any disclaimer, the term of this patent is extended or adjusted under 35 U.S.C. 154(b) by 435 days.

(21) Appl. No.: 15/785,493

(22) Filed: Oct. 17, 2017

Related U.S. Application Data

(63) Continuation-in-part of application No. 15/211,452, filed on Jul. 15, 2016, now Pat. No. 11,069,003.

(60) Provisional application No. 62/192,808, filed on Jul. 15, 2015.

(51) Int. Cl.
| | |
|---|---|
| *G06Q 40/00* | (2012.01) |
| *G06Q 30/02* | (2012.01) |
| *G06Q 50/00* | (2012.01) |
| *G06Q 20/10* | (2012.01) |
| *G06F 3/0482* | (2013.01) |

(52) U.S. Cl.
CPC ......... *G06Q 30/0279* (2013.01); *G06Q 20/10* (2013.01); *G06Q 50/01* (2013.01); *G06F 3/0482* (2013.01)

(58) Field of Classification Search
CPC .................. G06Q 30/0279; G06F 2221/2103
See application file for complete search history.

(56) References Cited

U.S. PATENT DOCUMENTS

| | | | |
|---|---|---|---|
| 7,080,916 B1 * | 7/2006 | Ferrin ................ | A47G 19/2227 220/705 |
| 7,933,810 B2 * | 4/2011 | Morgenstern .......... | G06Q 30/02 705/26.1 |
| 7,970,657 B2 | 6/2011 | Morgenstern | |
| 2008/0104496 A1 | 5/2008 | Williams et al. | |
| 2009/0192873 A1 * | 7/2009 | Marble .................. | G06Q 20/10 705/14.1 |
| 2010/0114685 A1 * | 5/2010 | Blass .................... | G06Q 20/10 705/14.16 |
| 2011/0054986 A1 * | 3/2011 | Rubin .................... | G06Q 10/10 705/14.2 |
| 2011/0295749 A1 * | 12/2011 | Scalisi ................... | G06Q 20/10 705/44 |
| 2012/0029981 A1 * | 2/2012 | Barton .................. | G06Q 20/10 705/14.1 |
| 2012/0215627 A1 * | 8/2012 | Lee ........................ | G06Q 30/02 705/14.45 |
| 2012/0233072 A1 * | 9/2012 | Calman .................. | G06Q 40/02 705/44 |
| 2013/0091058 A1 * | 4/2013 | Huster ................ | G06Q 20/322 705/44 |
| 2013/0311391 A1 | 11/2013 | Tuggle | |

(Continued)

OTHER PUBLICATIONS

How to Create an Encrypted Container File With BitLocker on Windows, published on Jul. 16, 14.

(Continued)

*Primary Examiner* — Ojo O Oyebisi
(74) *Attorney, Agent, or Firm* — Culhane Meadows PLLC; Orlando Lopez

(57) ABSTRACT

A system of these teachings for providing a graphical activatable link (also referred to as a badge) related to a activity includes a handheld mobile communication device, and a web site server configured to receive information from the handheld mobile communication device.

22 Claims, 33 Drawing Sheets

(56) References Cited

U.S. PATENT DOCUMENTS

| | | | | |
|---|---|---|---|---|
| 2014/0278861 A1* | 9/2014 | Bush | .................. | G06Q 30/0214 |
| | | | | 705/14.16 |
| 2014/0304056 A1* | 10/2014 | Postrel | ............... | G06Q 30/0226 |
| | | | | 705/14.27 |
| 2015/0026062 A1* | 1/2015 | Paulsen | .................. | G06Q 20/29 |
| | | | | 705/44 |
| 2016/0171570 A1* | 6/2016 | Dogin | ................ | G06Q 30/0605 |
| | | | | 705/26.2 |
| 2016/0196589 A1* | 7/2016 | Subbarayan | .......... | H04L 65/403 |
| | | | | 705/319 |
| 2017/0118147 A1* | 4/2017 | Dold | .................... | H04L 51/046 |

OTHER PUBLICATIONS

Chapter 5 Authentication in Rafael Pass, Abhi Shelat, A Course in Cryptography, 2010.

* cited by examiner

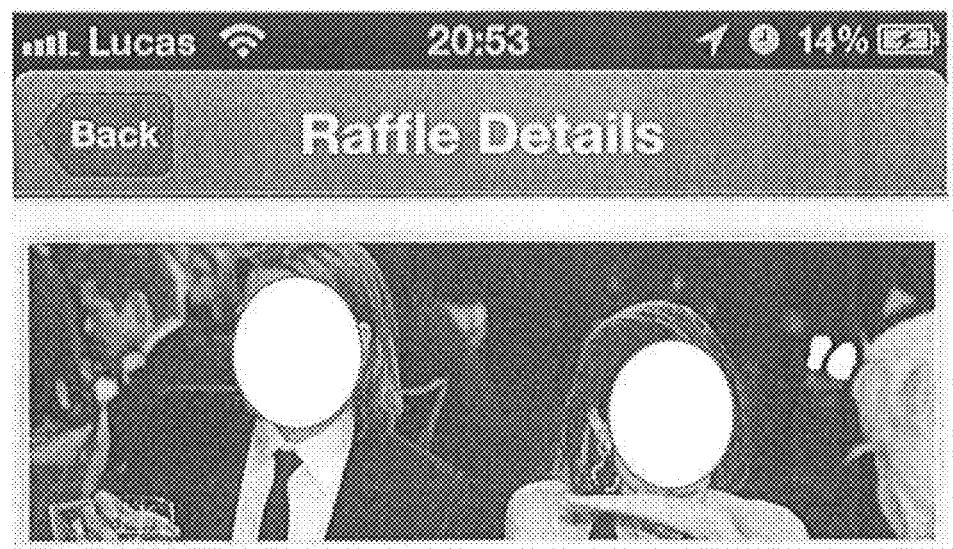
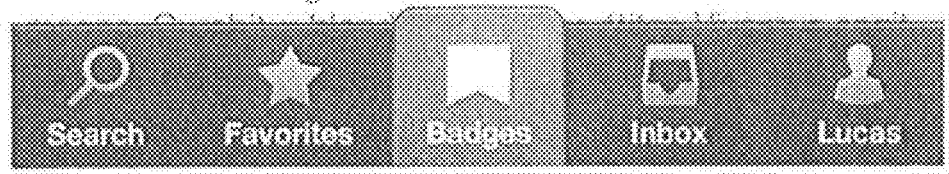
FIG. 9

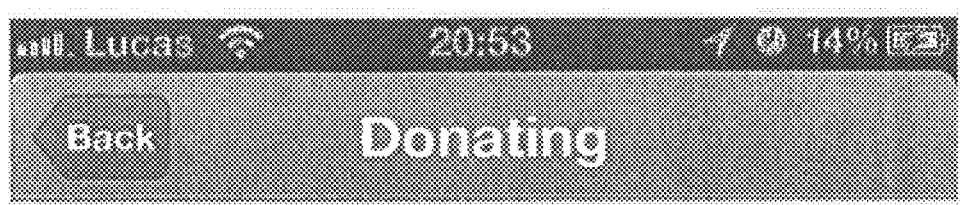
Fig. 14

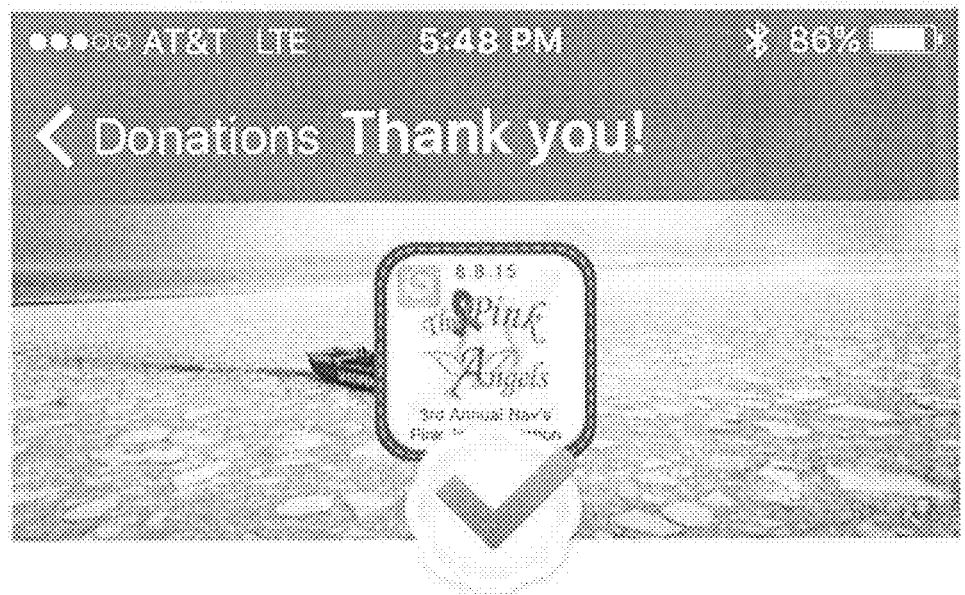
Thank you for your contribution of $562.00 in support of 3rd Annual Nav's Pink Jersey Auction! Your donation badge has been shared on the social networks you connected to your account.
FIG. 17
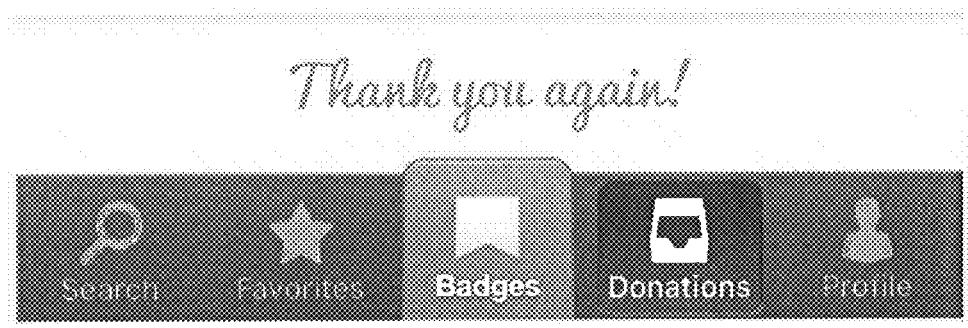

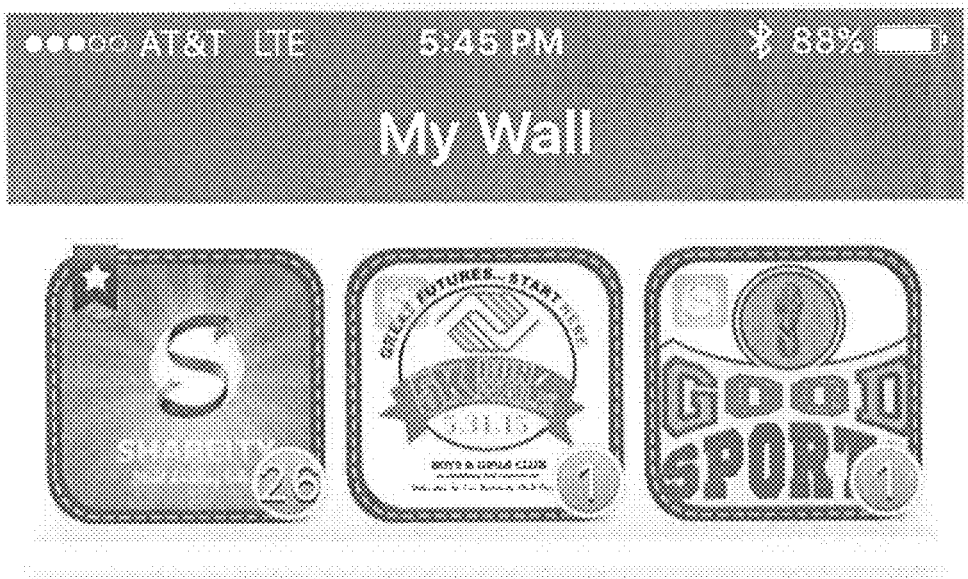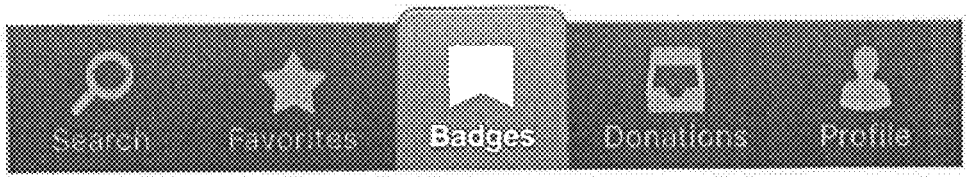
FIG. 18

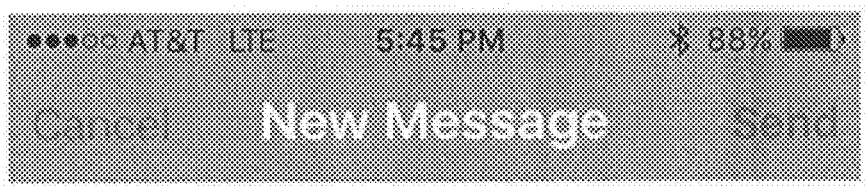
Fig. 18a

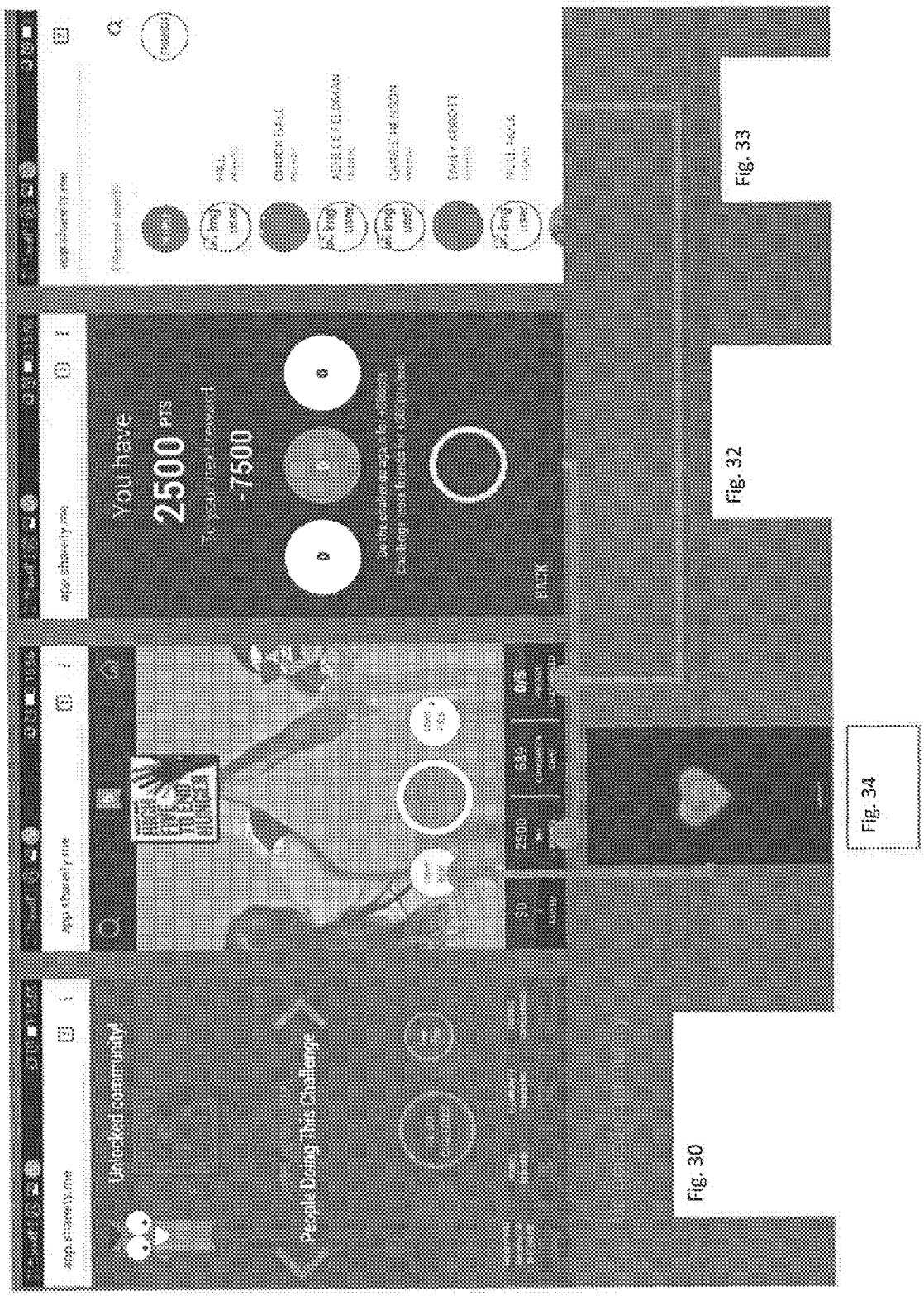

METHODS AND SYSTEMS FOR ACTIVITY DONATION

CROSS-REFERENCE TO RELATED APPLICATIONS

This application is a continuation in part of U.S. patent application Ser. No. 15/211,452, filed on Jul. 15, 2016, which claims priority to U.S. Provisional Patent Application No. 62/192,808, filed on Jul. 15, 2015, entitled METHODS AND SYSTEMS FOR ACTIVITY DONATION, both of which are incorporated by reference herein in their entirety for all purposes.

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

These teachings relate generally to donation to activities such as but not limited to and links that identify the donor.

One exemplary embodiment of activities are charities. Charity organizations operate often with voluntary staff, but nevertheless need plain money to address certain situations such as catastrophes and helping ill and/or poor people, among others. It is becoming more common to replace small business gifts with a donation to the charity and a card expressing that a donation has been made for the recipient. Perhaps even more common is the sending of cardboard based cards printed with a charity organization logo and text for the Red Cross®, WWF® and the like. The charity gains a small amount of money per each card purchased for the use.

The internet is quickly spreading to homes in developed countries and thereby gives rise to a number of electronic systems where a donation can be made. Such systems typically provide for voluntary credit to the charity or expose users to advertisements so that the site providing the donation service can utilize advertisers for accessing the donors. Some mobile telephone operators also support charities by donating a predetermined portion of their income. Such a method may ease the donating and help the charity, but, however, suffers from a given inflexibility: a user may not choose whom to aid and when, and the user cannot share her good spirits with a friend or business contact in a discreet and acceptable manner.

Although the Internet is almost ubiquitous, methods for rendering objects such as digital images tangible and marketable are not available. The existence of those methods will enhance the use of the Internet and the computer used to connect to the Internet as a means for obtaining, transferring, and exchanging objects such as digital images in a manner that the authenticity is preserved and renders the object tangible and marketable.

It is desired to provide new alternatives to carrying out donations and other crediting in general to desired parties. It is also desirable to enable capturing an ever-growing portion of people who donate to charities and other activities. There is also a need for methods for rendering objects such as digital images tangible and marketable.

BRIEF SUMMARY

New alternatives to carrying out donations and rendering objects such as digital images tangible and marketable are presented hereinbelow. Herein, the term "donations" is used in a broad sense and includes crediting in general to desired parties.

In one or more embodiments, the system of these teachings for providing a graphical activatable link (also referred to as a badge) related to an activity includes a handheld mobile communication device, an exchange/payment processing service configured to receive information from the handheld mobile communication device, an activity site configured to receive information from the handheld mobile communication device and the exchange/payment processing service and a social media site having a social media profile section corresponding to a person making a donation to the activity. The handheld portable communication device and a web site server have one or more processors, which are configured to select the activity from a activity list, the activity list being presented by an application in the handheld mobile communication device, make the donation to the activity using the handheld mobile communication device, verify that the donation has been made by communicating between the handheld mobile communication device and the exchange/payment processing service, provide, after verifying that the donation has been made, the graphical activatable link related to the activity to a profile section of the application corresponding to the person making the donation, and automatically post the graphical activatable link to at least one social media site corresponding to the person making the donation to the activity.

In one or more other embodiments, the system of these teachings for providing a graphical activatable link related to an activity includes a handheld mobile communication device, and a web site server configured to receive information from the handheld mobile communication device. The handheld mobile communication device and the web site server have one or more processors; the one or more processors being configured to:
  select an activity from a activity list, the activity list being presented in a graphical user interface by of the handheld mobile communication device;
  make the donation to the activity using in the handheld mobile communication device; wherein the exchange corresponding to the donation is a response to a challenge; the response to the challenge comprising providing a photo or providing a video;
  verify that the donation has been made by communicating between the handheld mobile communication device and the web site server;
  provide, after verifying that the donation has been made, the graphical activatable link related to the activity to a profile corresponding to the person making the donation; and
  provide, after verifying the donation has been made, access of the person making the donation to a community of users who have made donations to the activity.
The web site server site is also configured to process an exchange corresponding to the donation.

In one or more embodiments, the method of these teachings for providing a graphical activatable link related to an activity includes selecting the activity from an activity list, the activity list being presented by an application in a handheld mobile communication device, making the donation to the activity using the handheld mobile communication device, verifying that the donation has been made by communicating between the handheld mobile communication device and an exchange/payment processing service, providing, after verifying that the donation has been made, the graphical activatable link related to the activity to a profile section of the application corresponding to the person making the donation, and automatically posting the graphical activatable link to at least one social media site corresponding to the person making the donation to the activity.

In one or more other embodiments, the method of these teachings for providing a graphical activatable link related to an activity includes selecting the activity from a activity list, the activity list being presented by an application in a handheld mobile communication device, making a donation to the activity using the handheld mobile communication device, wherein an exchange corresponding to the donation is a response to a challenge, the response to the challenge comprising providing a photo or providing a video, and communicating between the handheld mobile communication device and a web site server in order to verify that the donation has been made.

For a better understanding of the present teachings, together with other and further needs thereof, reference is made to the accompanying drawings and detailed description and its scope will be pointed out in the appended claims.

BRIEF DESCRIPTION OF THE DRAWINGS

FIGS. 1-18b are graphical representations of screenshots of one embodiment of the system of these teachings;

FIGS. 21-36 are graphical representations of screenshots of another embodiment of the system of these teachings;

DETAILED DESCRIPTION

The following detailed description presents the currently contemplated modes of carrying out the invention. The description is not to be taken in a limiting sense, but is made merely for the purpose of illustrating the general principles of the invention, since the scope of the invention is best defined by the claims.

"Application," as used herein in terms of an item downloaded to a mobile device, refers to a software module that, when downloaded to the mobile device and residing in a computer usable media in the mobile device and operated by a processor, causes a particular function or response.

A "graphically activatable link," as used herein, is a graphical object that enables activating a link, which link contains a location address or an identifier for a location address.

A "merchant service," as used herein, is an authorized financial service that allows accepting credit card or bank debit card or similar transactions online.

Figure 19:
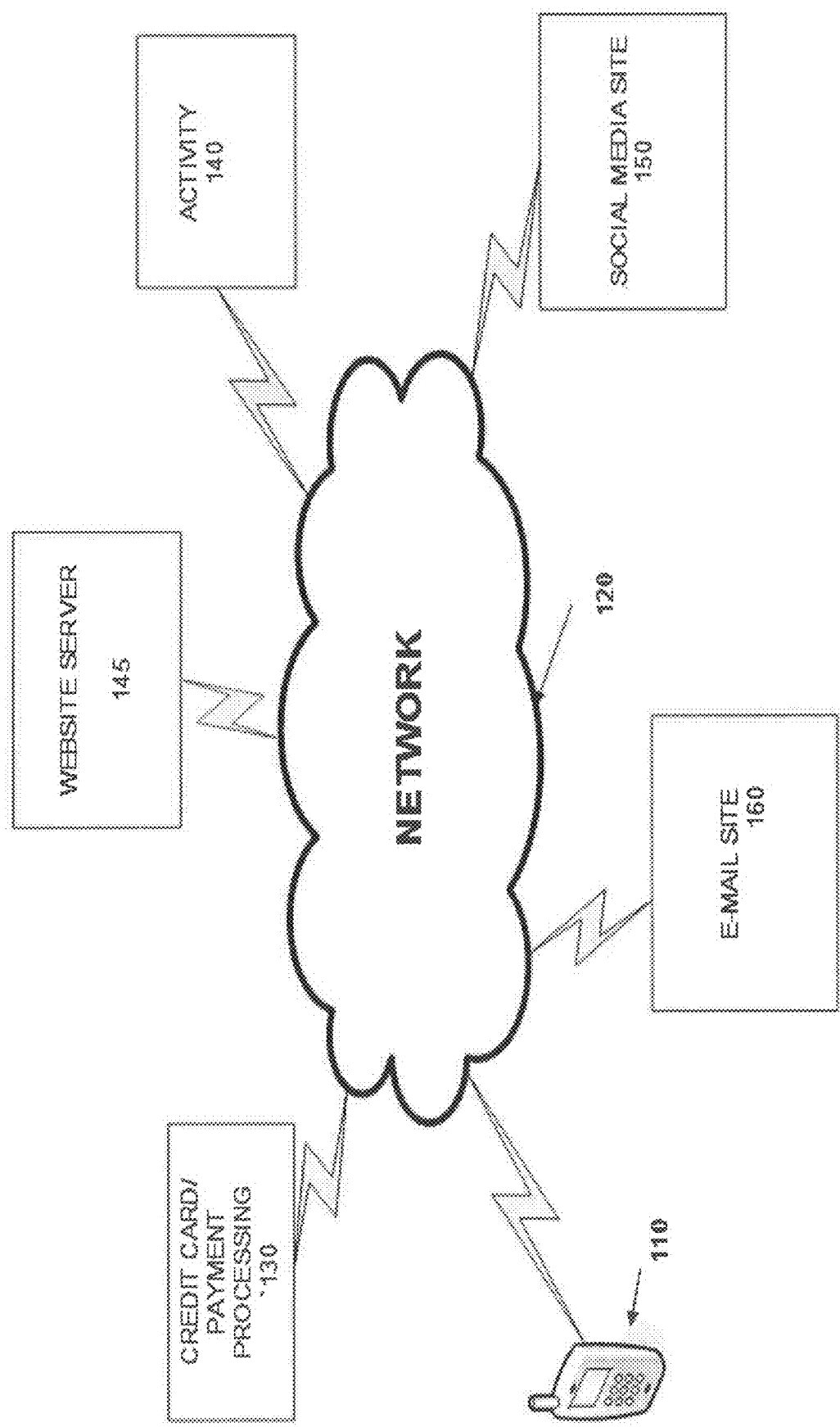
FIG. 19 is a schematic representation of one embodiment of the system of these teachings.

FIG. 19 is a schematic representation of one embodiment of the system of these teachings. Referring to FIG. 19, in the embodiment shown therein, a handheld mobile communication device 110, which can download applications, access web sites over the network and run applications, is connected through a network 120 to an exchange/payment processing site (component) 130, to one or more activity sites 140, to one or more social media sites 150, to a web site server 145 and to one or more email sites 160.

In one or more embodiments, the system of these teachings for providing a graphical activatable link (also referred to as a badge; for examples of uses of activatable link see, for example, U.S. Pat. No. 6,952,799, which is incorporated by reference herein in its entirety and for all purposes) related to an activity includes a handheld mobile communication device, an exchange/payment processing site configured to receive information from the handheld mobile communication device, an activity site configured to receive information from the handheld mobile communication device and the exchange/payment processing site and a social media site having a social media profile section corresponding to a person making a donation to the activity. The handheld portable communication device and the web site server have one or more processors, which are configured to select the activity from an activity list, the activity list being presented by an application in the handheld mobile communication device, make the donation to the activity using the handheld mobile communication device, verify that the donation has been made by communicating between the handheld mobile communication device and the exchange/payment processing site, provide, after verifying that the donation has been made, the graphical activatable link related to the activity to a profile section of the application corresponding to the person making the donation, and automatically post the graphical activatable link to at least one social media site corresponding to the person making the donation to the activity. The distribution of tasks between the handheld portable communication device and the activity site vary from an "app" received at and resident in the handheld portable communication device to accessing, from the handheld portable communication device, a website at the web site server. When the website is used, the user can receive text with a link and activating the link will connect the user to the website.

In one or more other embodiments, the system of these teachings for providing a graphical activatable link related to an activity includes a handheld mobile communication device, a web site server configured to receive information from the handheld mobile communication device. The handheld mobile communication device and the web site server have one or more processors; the one or more processors being configured to:

select an activity from a activity list, the activity list being presented in a graphical user interface by of the handheld mobile communication device;

make the donation to the activity using in the handheld mobile communication device; wherein the exchange corresponding to the donation is a response to a challenge; the response to the challenge comprising providing a photo or providing a video;

verify that the donation has been made by communicating between the handheld mobile communication device and the web site server;

provide, after verifying that the donation has been made, the graphical activatable link related to the activity to a profile corresponding to the person making the donation; and provide, after verifying the donation has been made, access of the person making the donation to a community of users who have made donations to the activity.

The web site server is also configured to process an exchange corresponding to the donation. The distribution of tasks between the handheld portable communication device and the web site server vary from an "app" received at and resident in the handheld portable communication device to accessing, from the handheld portable communication device, a website at the web site server. When the website is used, the user can receive text with a link and activating the link will connect the user to the website.

In one or more embodiments, the method of these teachings for providing a graphical activatable link related to an activity includes selecting the activity from an activity list, the activity list being presented by an application in a handheld mobile communication device, making the donation to the activity using the handheld mobile communication device, verifying that the donation has been made by communicating between the handheld mobile communication device and an exchange/payment processing service, providing, after verifying that the donation has been made, the graphical activatable link related to the activity to a profile section of the application corresponding to the person making the donation, and automatically posting the graphical activatable link to at least one social media site corresponding to the person making the donation to the activity.

In one or more other embodiments, the method of these teachings for providing a graphical activatable link related to an activity includes selecting the activity from a activity list, the activity list being presented by an application in a handheld mobile communication device, making a donation to the activity using the handheld mobile communication device, wherein an exchange corresponding to the donation is a response to a challenge, the response to the challenge comprising providing a photo or providing a video, and communicating between the handheld mobile communication device and a web site server in order to verify that the donation has been made.

Figure 1:
Figure 2:
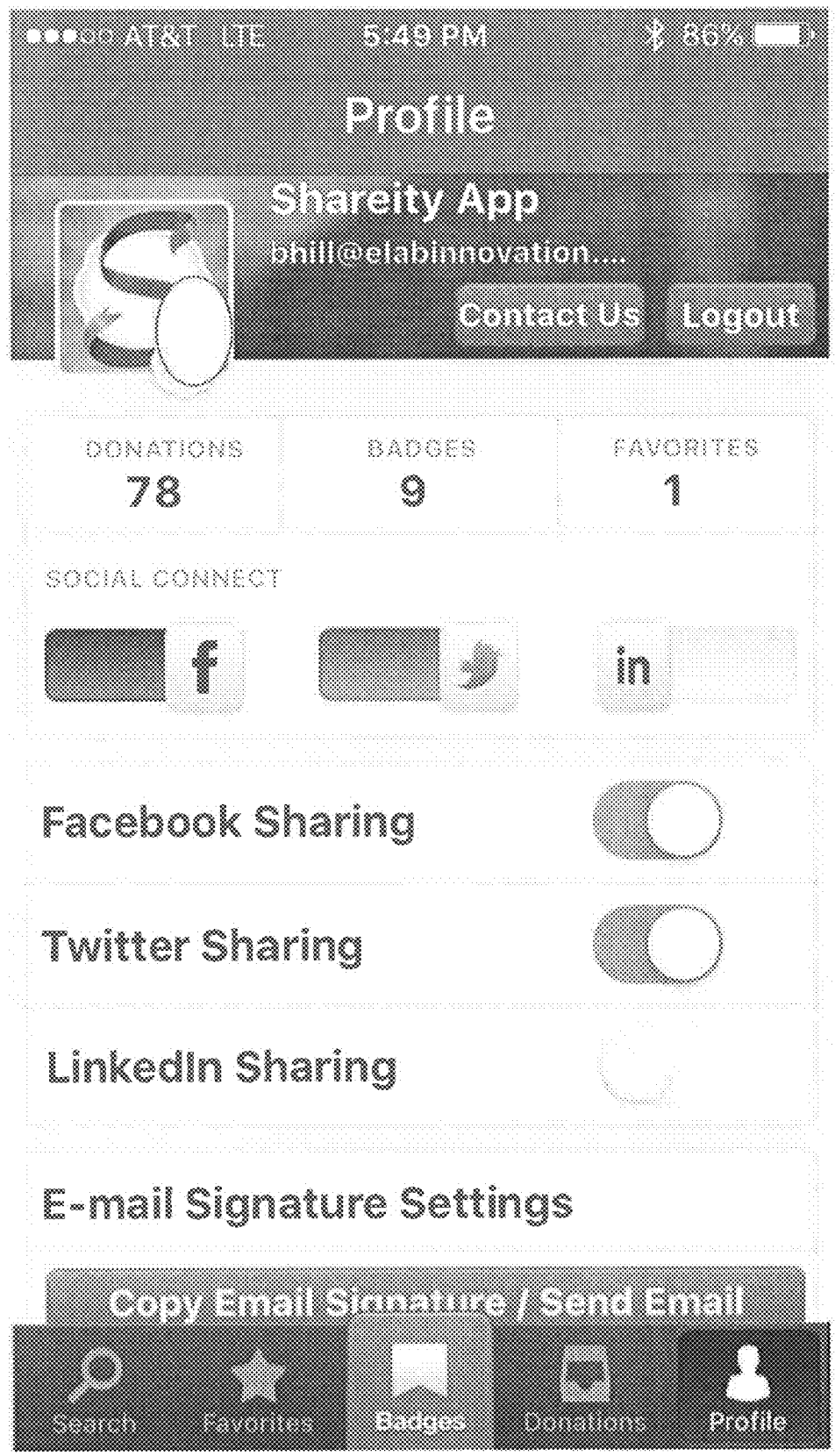
Figure 3:
Figure 4:
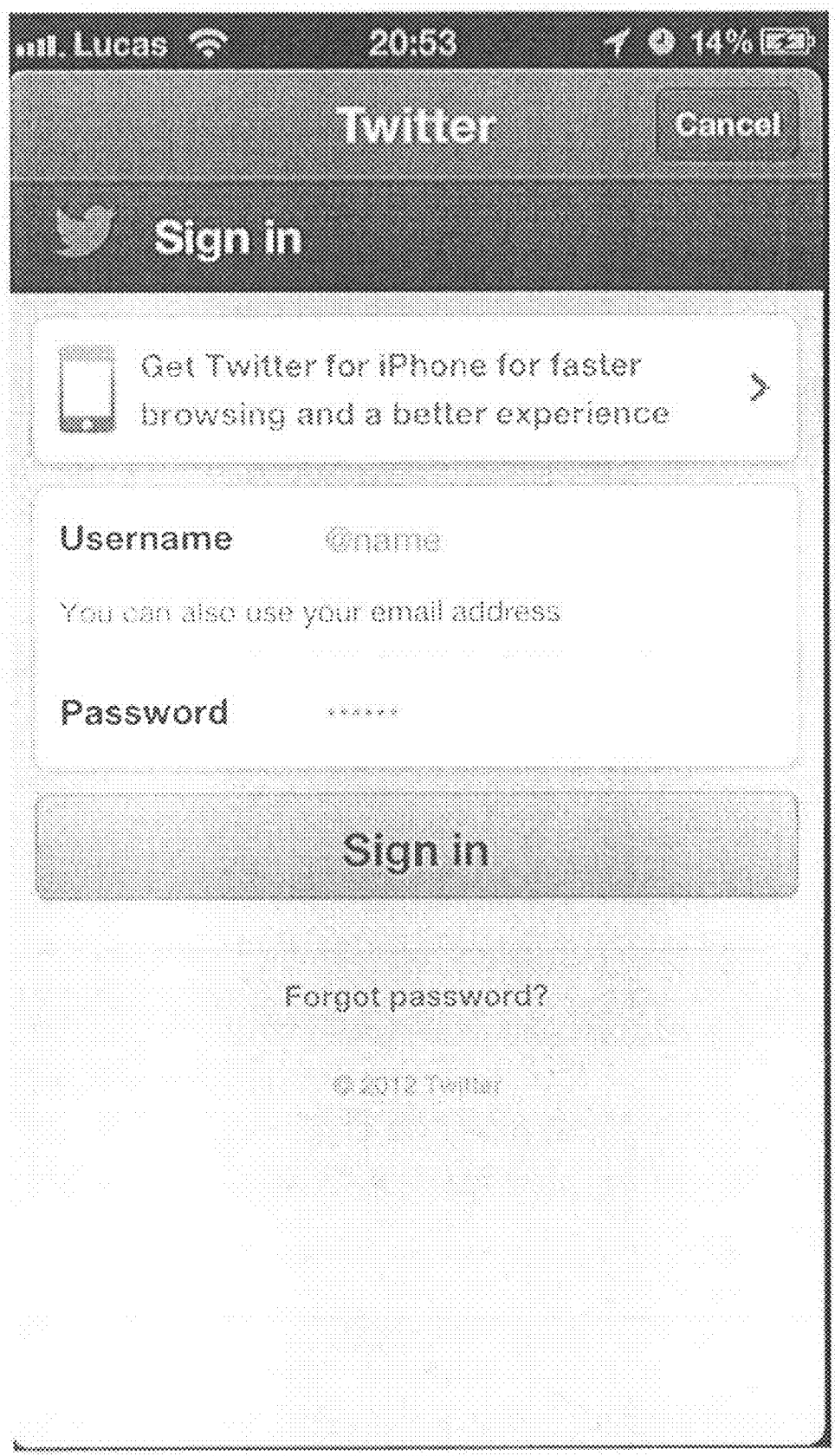
Figure 5:
Figure 6:
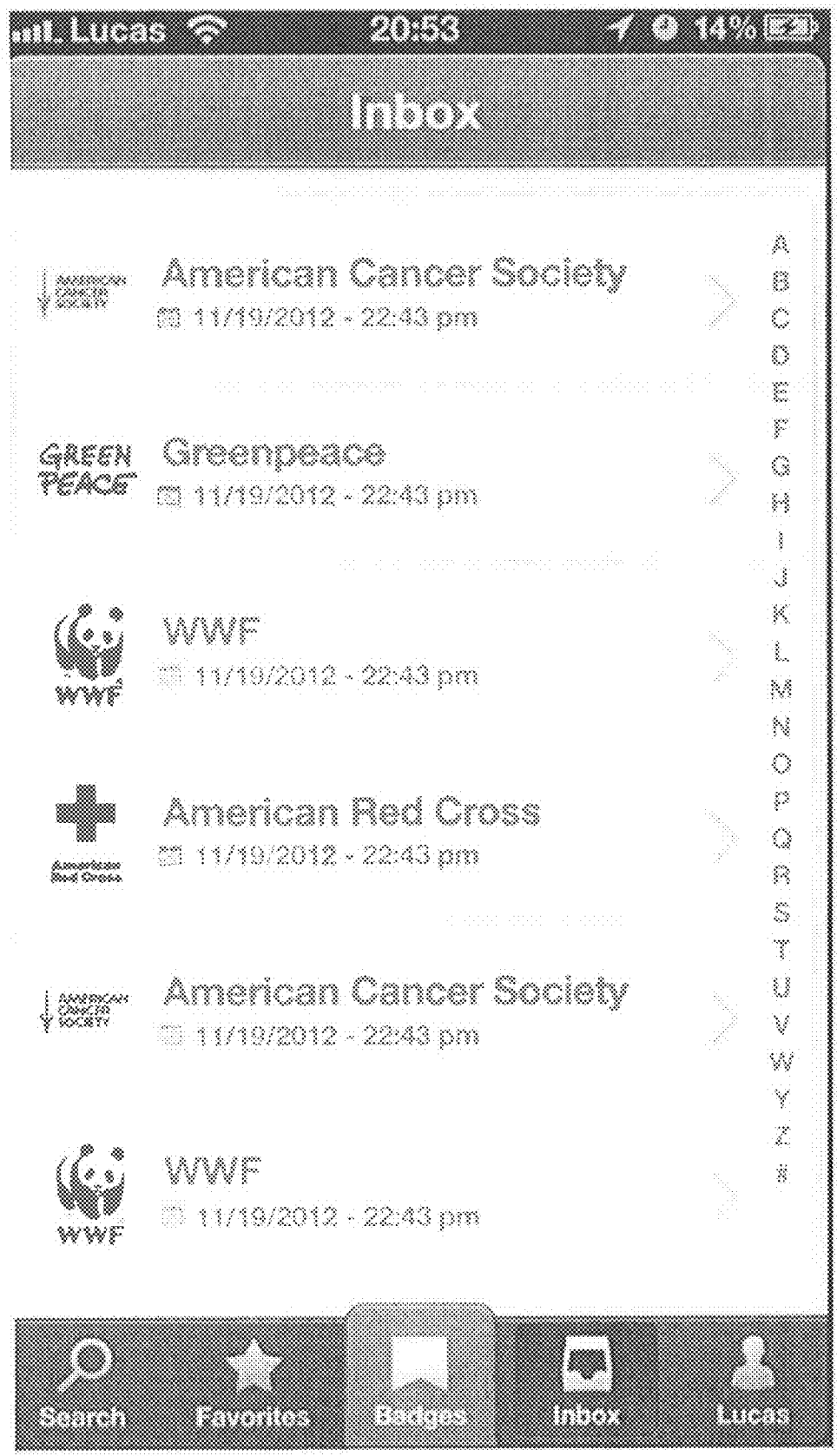
Figure 7:
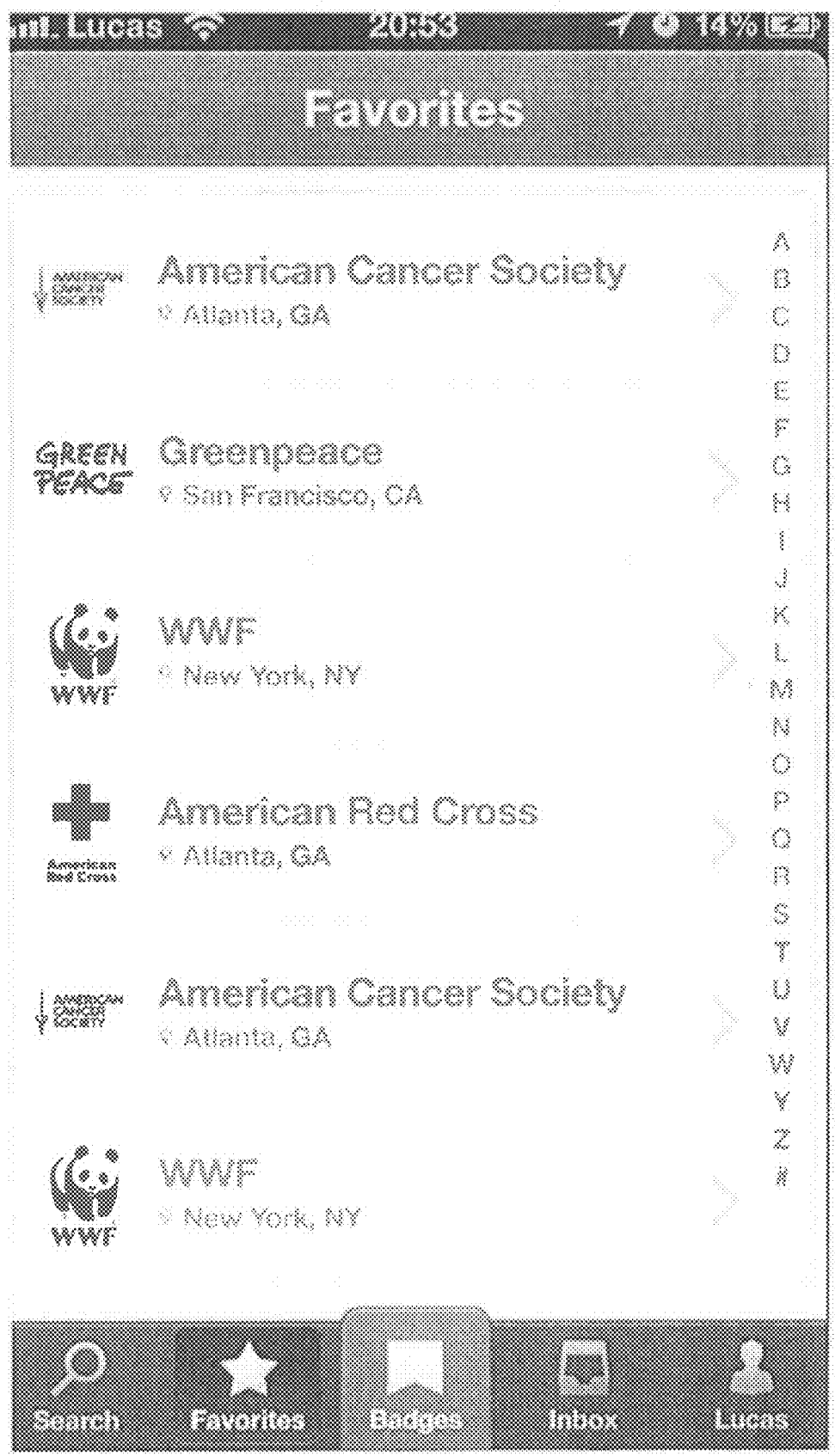
Figure 8:
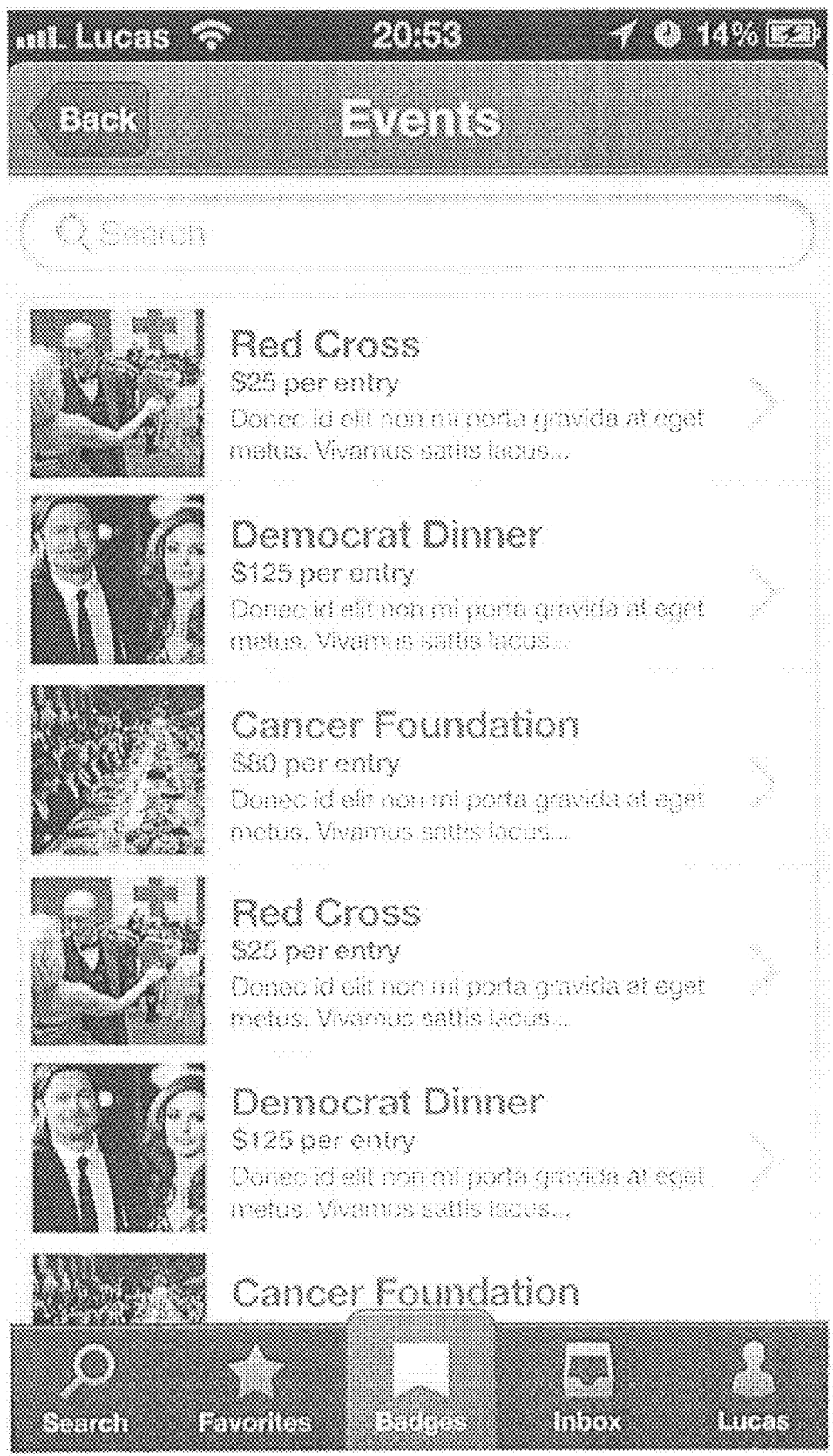
Figure 10:
Figure 11:
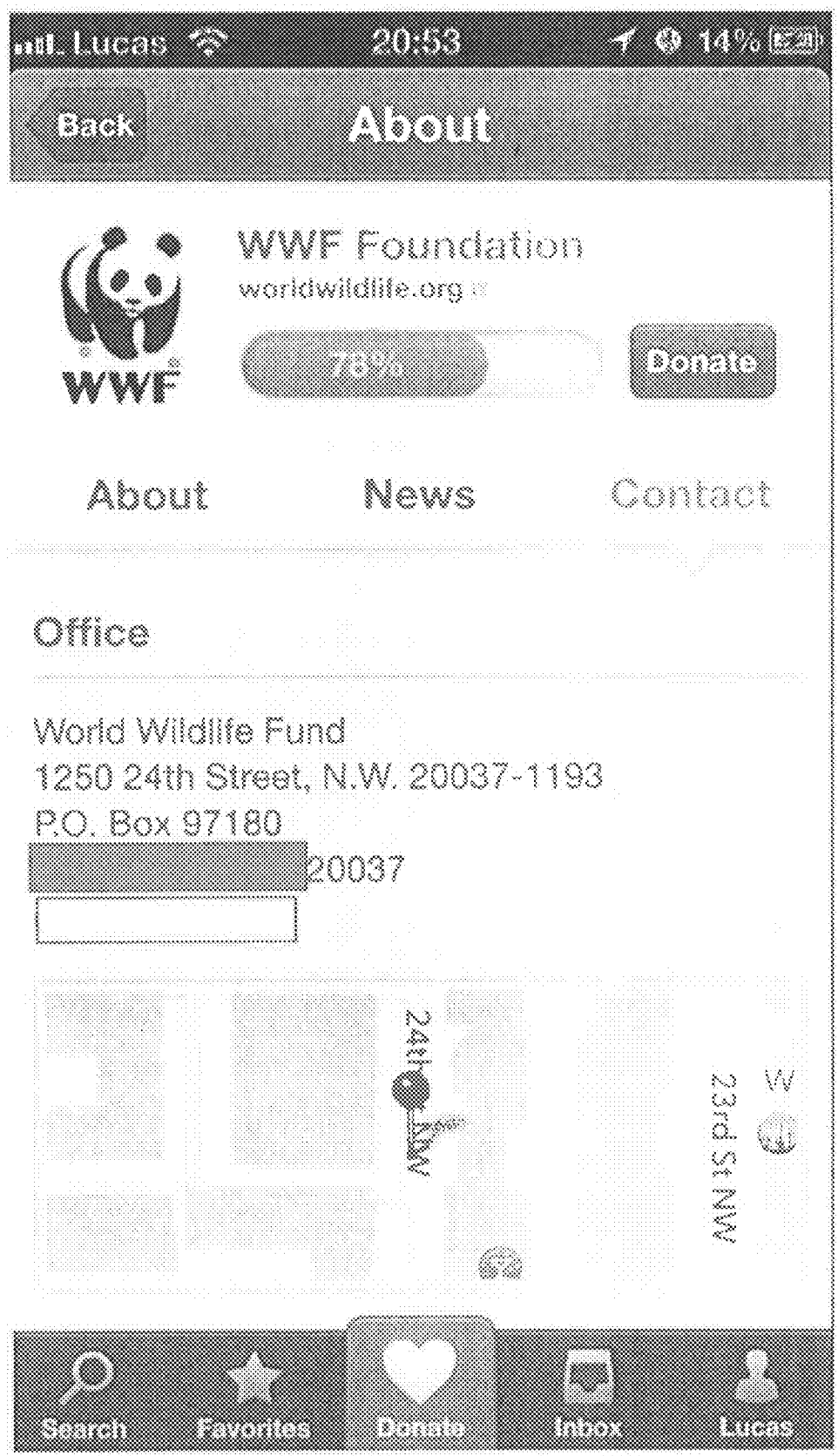
Figure 12:
Figure 13:
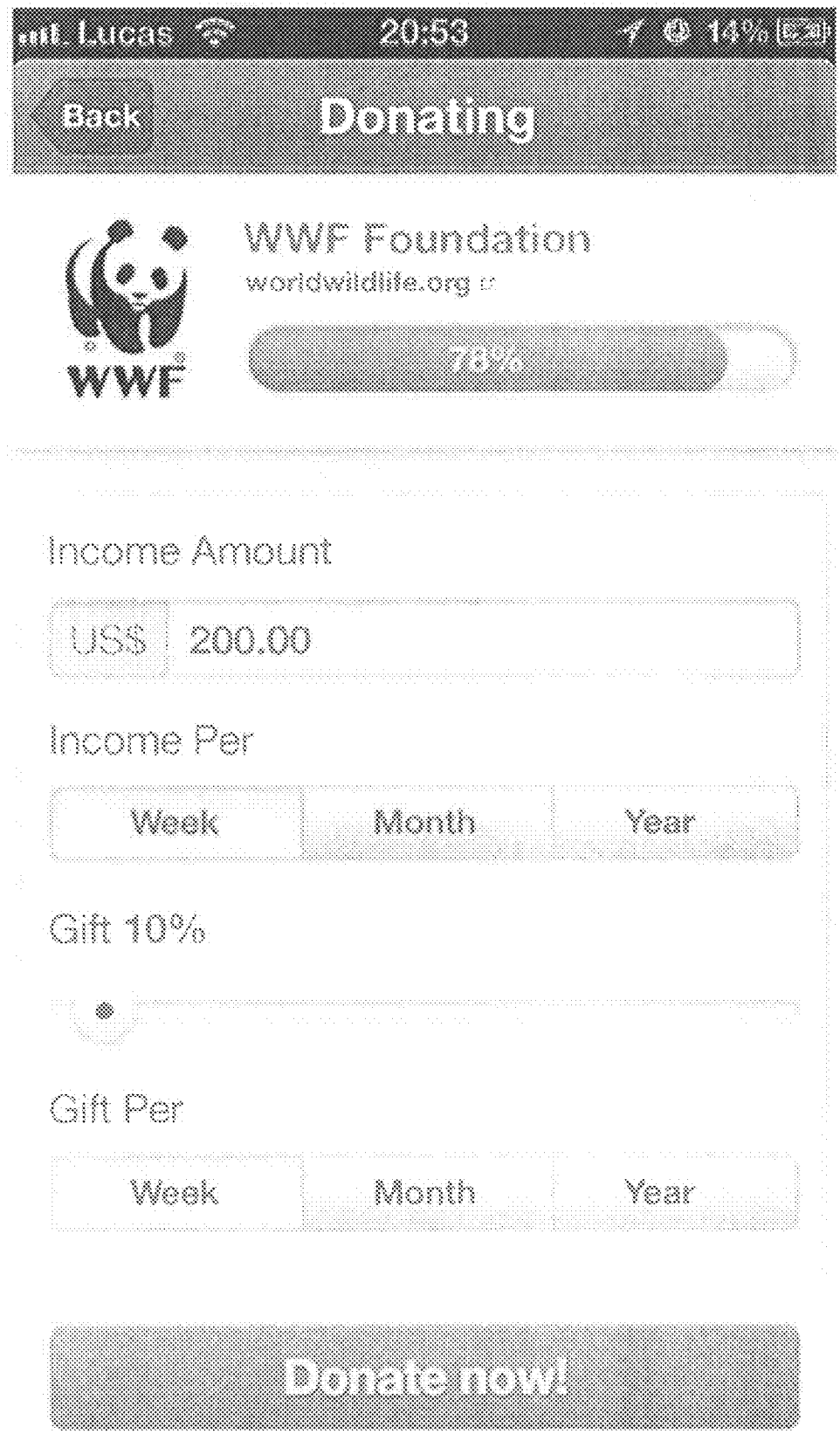
Figure 15:
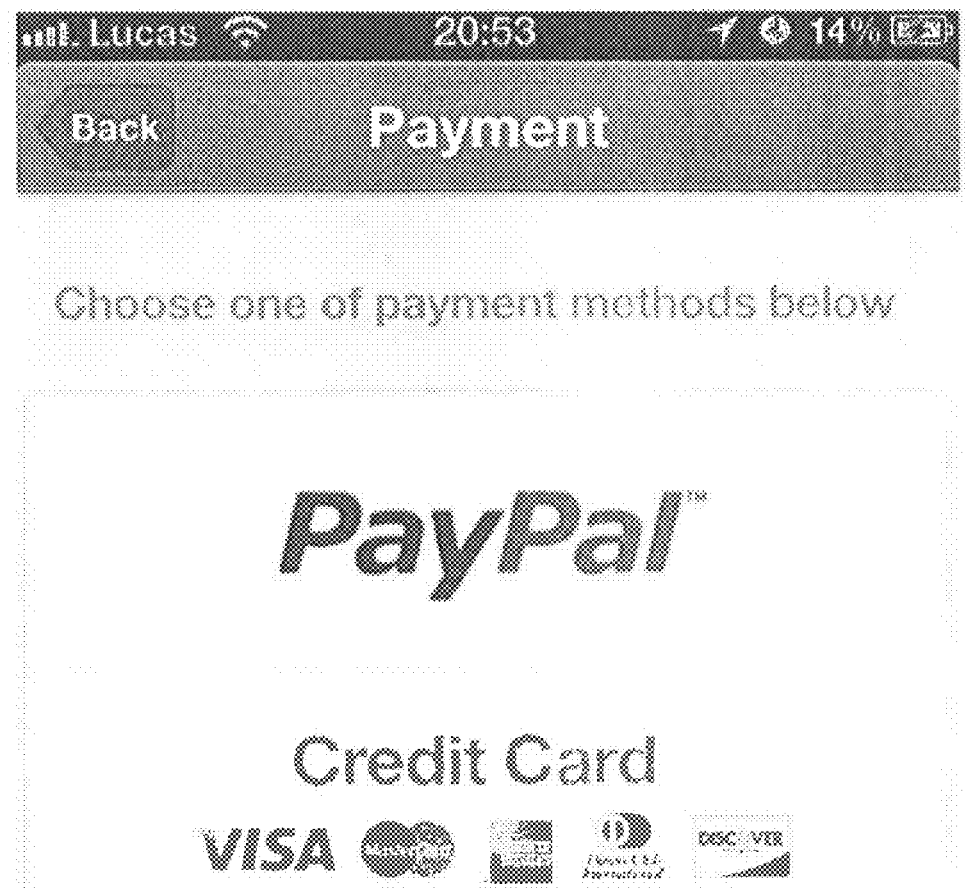
Figure 16:
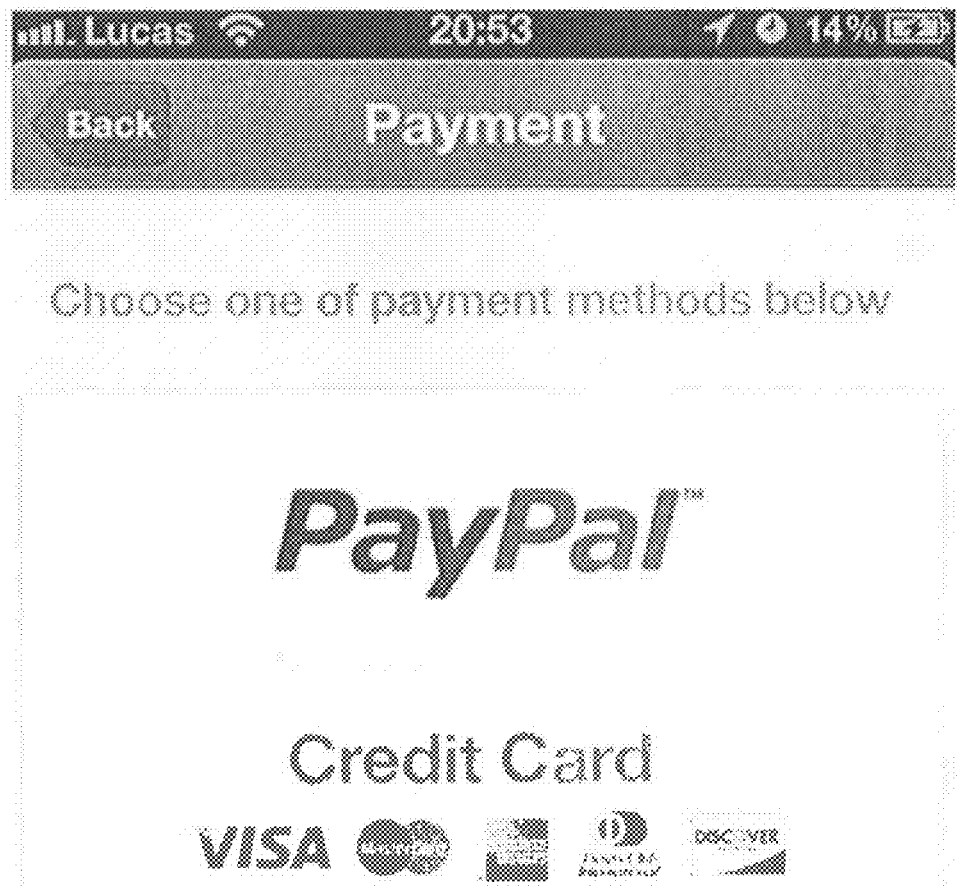
Figure 18B:
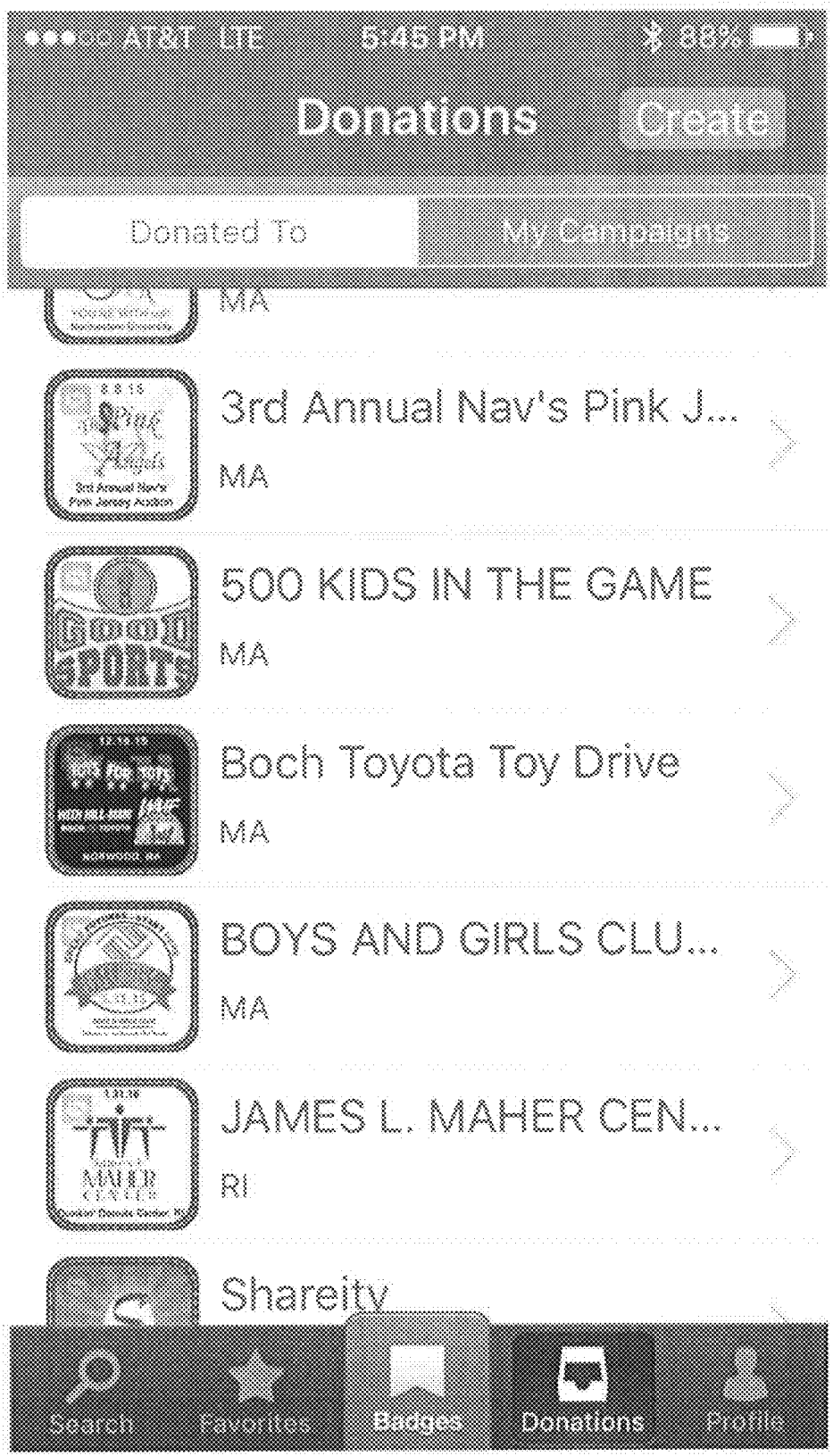

In order to further elucidate these teachings, an exemplary embodiment is described herein below. FIGS. 1-18b are graphical representations of screenshots of one embodiment of the system of these teachings. FIG. 1 depicts the screen shot from the screen produced after the application is activated (started running). The application shown in FIG. 1 is name Shariety. A user running the application starts by populating a profile, as shown in FIG. 2. The profile also gives a tally of the donations by the user, the "badges" obtained by the user and the favorite charities. FIGS. 3 and 4 show the user providing logging information for two social media sites, Facebook and Twitter in the example shown. FIG. 5 depicts a list of the charities, with only some of the charities shown. FIG. 6 shows selected charities. FIG. 7 shows favorite charities. FIG. 8 shows a list of activity events to which the user can donate and FIG. 9 shows details for one such event. (In one instance, the badge can be used in order to gain entrance into the event. In other words, the badge replaces a ticket.) FIG. 10 shows information about one activity which can be obtained by activating (such as clicking on) the activity name or symbol. Included in the information for the activity is the percentage of the donations that are used for the purpose of the activity. The information is divided into information about the activity, news about the activity and contact information for the activity. The topics are accessible by activating the word in the banner. FIG. 11 shows the contact information for the activity. FIG. 12 shows the news about the activity. If the user decides to donate to the activity, the user then activates the donate button in the screen providing information about the activity. Upon activation of the donate button, the user is presented in new screen that the user can use to select the amount of the donation. Upon selection of the amount, a summary of the donation is presented to the user for review, as shown in FIG. 14. To complete the donation the user activates the Donate now button. The user is then provided with available payment services, for example, PayPal™ or credit card services, as shown in FIG. 15. (Although a donation is depicted as involving a monetary exchange, it should be noted that other donations are within the scope of these teachings.) FIG. 16 shows the required credit card information is the user is using credit card services. Upon verification by the payment service, the donation was made to the activity and a thank you screen is provided to the user, as shown in FIG. 17. Upon verification by the payment service, a graphical activatable link (also referred to as a badge) is placed on the user "wall" area of the application, as shown in FIG. 18. FIG. 18b shows a record list of all the donations that the user has made.

Once the badge is placed on the user wall area, the application automatically posts the badge to the user's social media sites. Automatic posting is performed, in one embodiment, using the software development kit (SDK) of the social media site or the application programming interface (API) for the social media site in developing the automatic posting instructions. In some instances, a PHP SDK is used or a PHP library is used in automatic posting.

Many social media sites have a time limit for the time a posting is kept available. Using the timing component in the one or more processors, the automatic posting component keeps track of the time over which the posting has been available and, when the time exceeds the time limit, reposts the badge. The automatic posting component also keeps track of the total time over which the badge has been posted and, if the total time exceeds a predetermined time, the application removes the badge from the wall and removes the posting.

Automatic posting has a significant value to the activity donation. Most users have very little extra time (see, for example, Steffan Burenstam Linder, The Harried Leisure Class). Posting to social media, if made the responsibility of the user, may not happen and reposting is even less likely. Keep in the posting active in the social media is important to the donation program since it is a way to propagate the donation. Once the badge is posted, the posting is presented to the social media network of the user. Since the badge is a graphical activatable link, the members of the social network of the user can obtain more information about the activity and about the application. The link can provide access to the application that provides the badges and to the activity. It is possible for the donation to go viral. This is ensured and enabled by the automatic posting.

The application can also place the badge in the signature section of the user profile in an email program. The application place at the badge in the signature section by copying the badge, accessing the signatures section and after the last line in the signature copying the badge to the signature section for the user. FIG. 18a shows an e-mail with the badges posted after the last line in the signature.

In one embodiment, the number of accesses to the badge (activatable graphical link) is counted. The number of accesses can be related to the number of referrals. The counting of the number of factors can be performed, in one instance, at the activity site, or, in another instance, at the application running in the handheld mobile communication device. The badge can be updated or a new batch provided for a large number of referrals or for a specified number of referrals.

Figure 20:
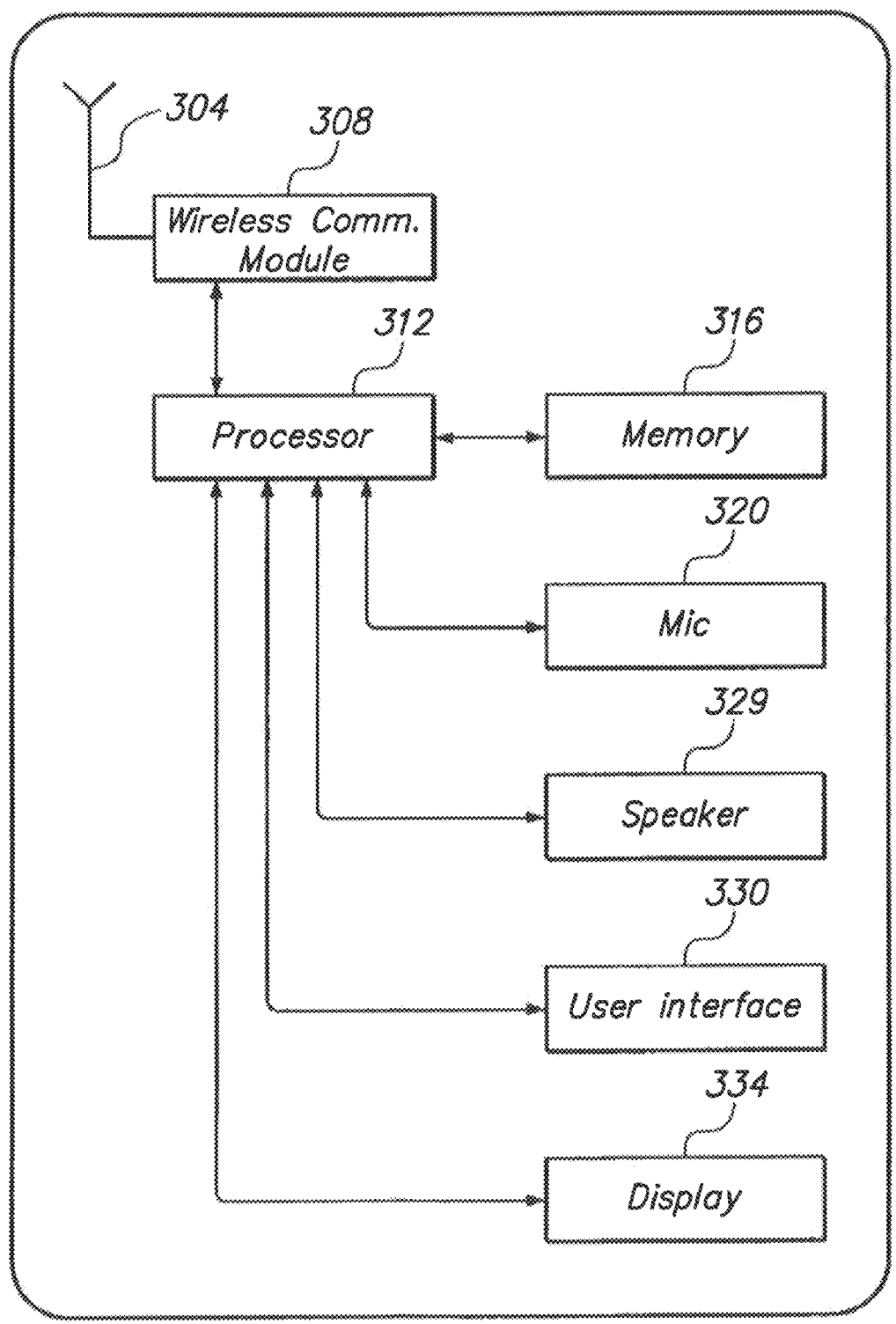
FIG. 20 represents a handheld mobile device as used in one embodiment of these teachings.

FIG. 20 shows one embodiment of the handheld mobile communication device used in these teachings. In the embodiment shown in FIG. 20, the handheld mobile communication device has an antenna 304 operatively connected to a wireless communication module 308. The wireless communication module 308 is operatively connected to one or more processors 312. A user interface 330 and a display 334 are operatively connected to the one or more processors 312. A memory 316, which has computer readable code embodied therein, is also operatively connected to the one or more processors 312. The computer readable code, when executed by the one or more processors 312, causes the one or more processors 312 to display an icon for the application in the user interface 330 and, when the icon is activated, execute the application. The handheld mobile communication device, in the embodiment shown in FIG. 20, also has a microphone 320 and a speaker 329 operatively connected to the one or more processors 312.

It should be noted that "donation" is used in a broad sense. In one instance, an exchange corresponding to the donation is a monetary exchange and the exchange/payment processing component is configured to use a merchant service. In another instance, an exchange corresponding to the donation is a response to a challenge and the exchange/payment processing component is configured to ascertain that the response to the challenge has been performed.

Figure 41:
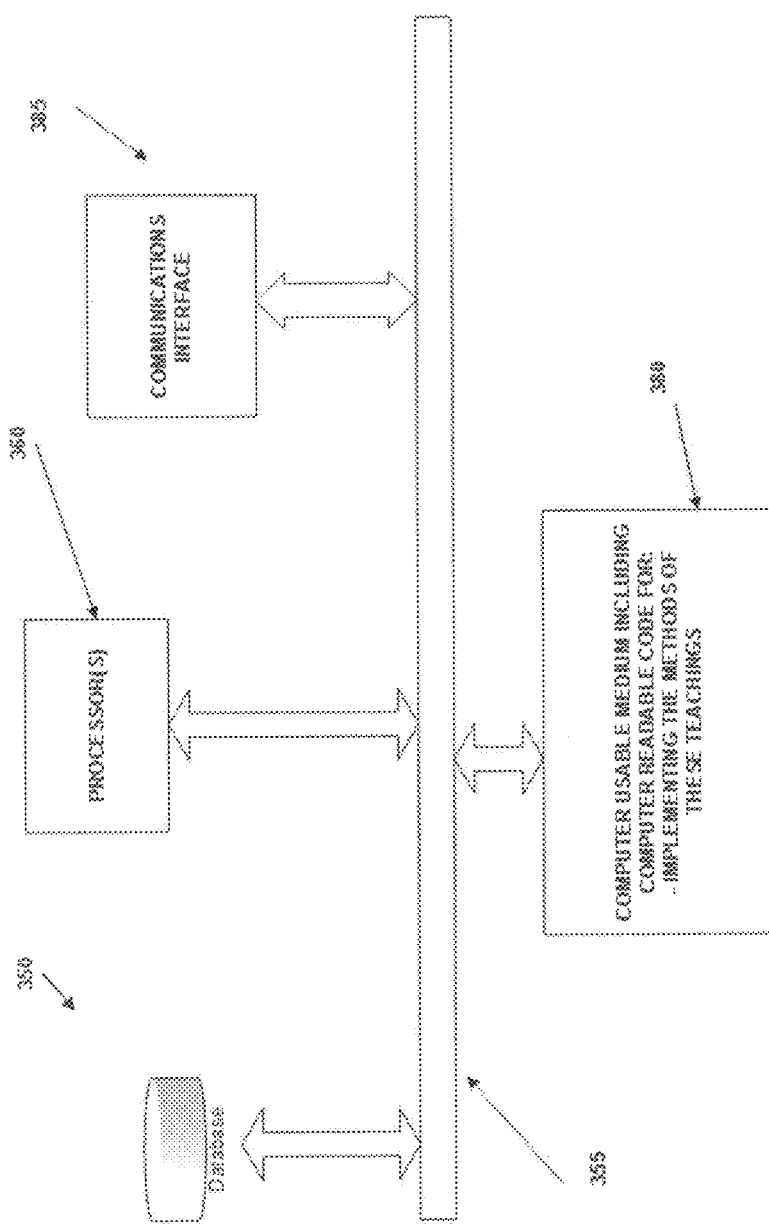
FIG. 41 is a schematic representation of one embodiment of the web site server of these teachings.

In one embodiment, the web site server 145 of these teachings includes one or more processors (360, FIG. 41), one or more communication devices for communicating over a network (385, FIG. 41), one or more computer usable media having computer readable code embodied therein causing the one or more processors to perform the method of the present teachings (380, FIG. 41). In one instance, the server also includes another computer usable medium having the database 350 described hereinabove embodied therein. The one or more processors 360, the one or more communication devices 385, the one or more computer usable media 380 and the database 350 are operatively connected by a computer connection component 355. One embodiment of the general structure of the web site server 145 is shown in FIG. 41.

Figures 21, 22, 23:
Figures 24, 25, 26:
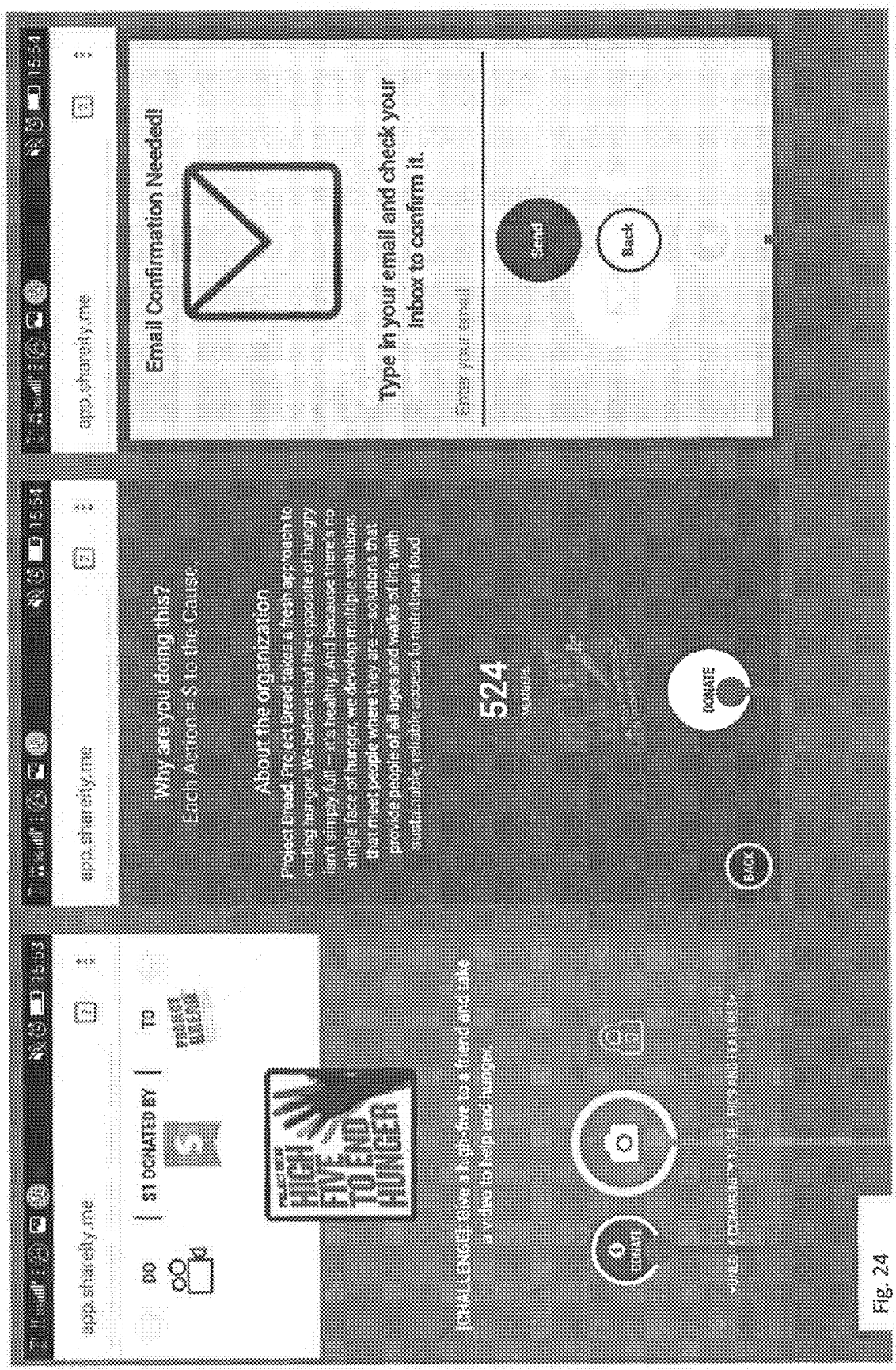
Figures 27, 28, 29:
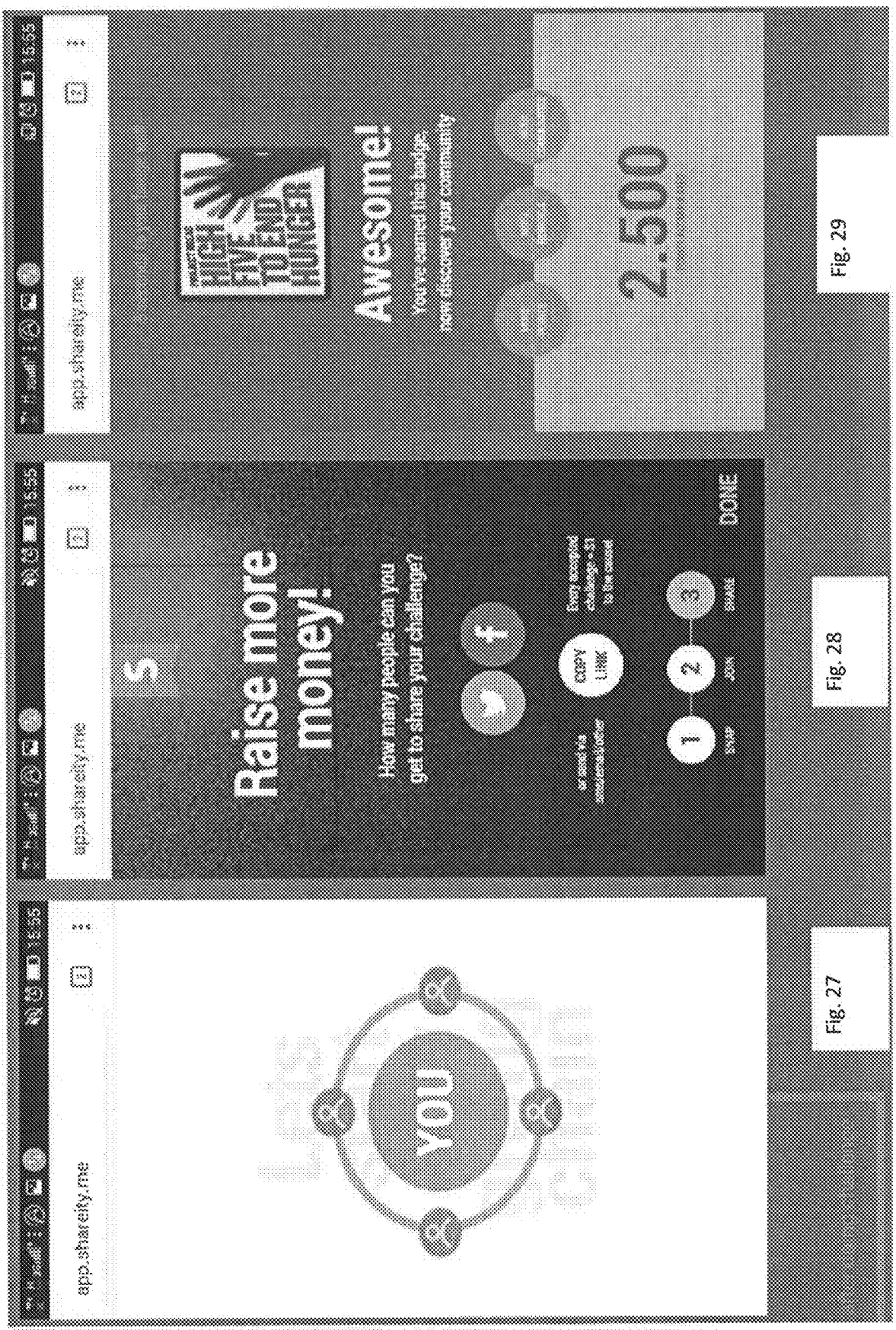
Figure 35:
Figure 36:
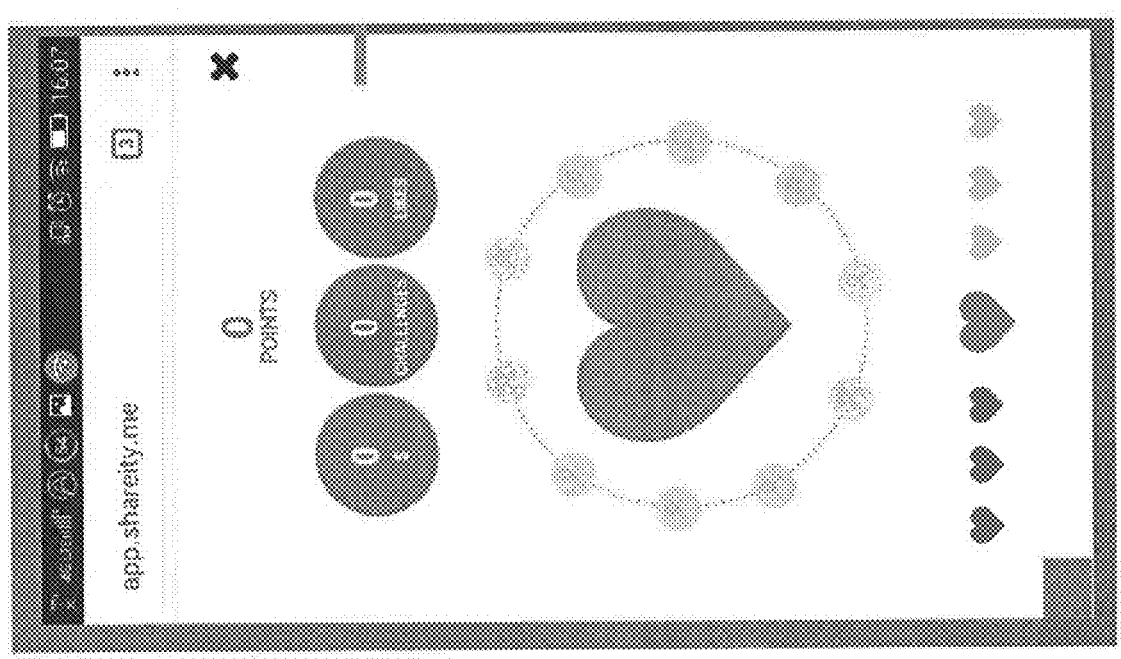

FIGS. 21-34 are graphical representations of screenshots of another embodiment of these teachings. FIG. 21 shows the screenshot received from a website and allowing a user to select a challenge. FIG. 22 shows another screenshot received from the website and allowing the user to select a challenge. FIG. 23 shows a screenshot depicting one challenge. FIG. 24 shows another screenshot depicting the one challenge. In the embodiments shown in FIGS. 23 and 24, a monetary donation is provided by another entity when a user completes the challenge, the challenge including a photo or video. When the user takes the picture or video required for the challenge and submits the picture or video by activating the "button," upon verification that the activity site, the challenge is completed. FIG. 25 shows a description of the entity receiving the donation. FIG. 26 shows a screenshot informing that email confirmation is needed. FIG. 27 shows a screenshot received after completing the challenge. In the embodiment shown in FIG. 27, the user can invite others to take the challenge. After completing the challenge, the user is admitted to a social media community related to the challenge (the community is unlocked to the user). In one embodiment, upon completion of the challenge, the user receives an announcement from the other entity that is providing the monetary donation. If the user is performing the tasks in a mobile device, the announcement can be provided during a setup time, as described in US patent publication US20160098758A1, which is incorporated by reference herein in its entirety and for all purposes. FIG. 28 shows another screenshot reminding the user to invite others to take the challenge. FIG. 29 shows a screenshot depicting the badge earned by the user, detailing the points earned and inviting the user to discover the social media community related to the challenge. FIG. 30 shows a screenshot depicting the unlocked community of people who have performed the challenge. FIG. 31 shows a screenshot depicting the state (dollars raised, points obtained, and friends that have performed the challenge) of the user in the community. By activating the "button" in the lower ribbon in FIG. 31 the user can get information on the points, as shown in FIG. 32 or the user can get information on friends who have performed the challenge, as shown in FIG. 33. (The word "button" is used here in in the same manner as it is used in relation to graphical user interfaces, see, for example, Petzold, Programming Windows, Fifth Edition. Chapter 9, Child Window Controls, which is incorporated by reference here in in its entirety and for all purposes.) By activating the "button" labeled "lightbeat," the user can obtain an animation which has a beating lighted figure, as shown in FIG. 34 and FIG. 35. The lightbeat can be used at events to unify users who are donating and to entice other users to donate. FIG. 36 shows another screenshot depicting the state (dollars raised, points obtained, and friends that have performed the challenge) of the user.

Figure 37:
FIGS. 37-40 are graphical representations of exemplary embodiments of a challenge.
Figure 38:
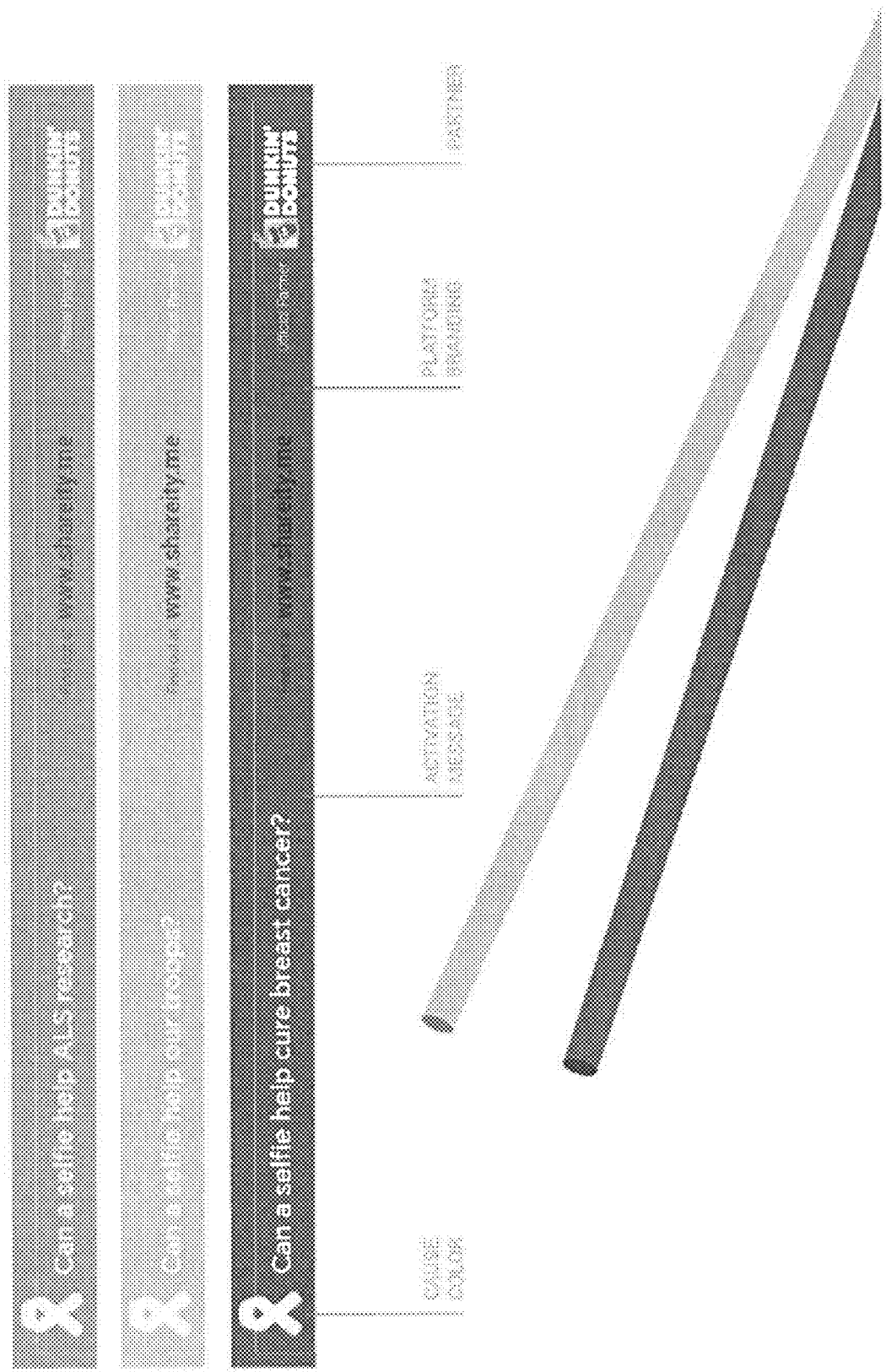
Figure 39:
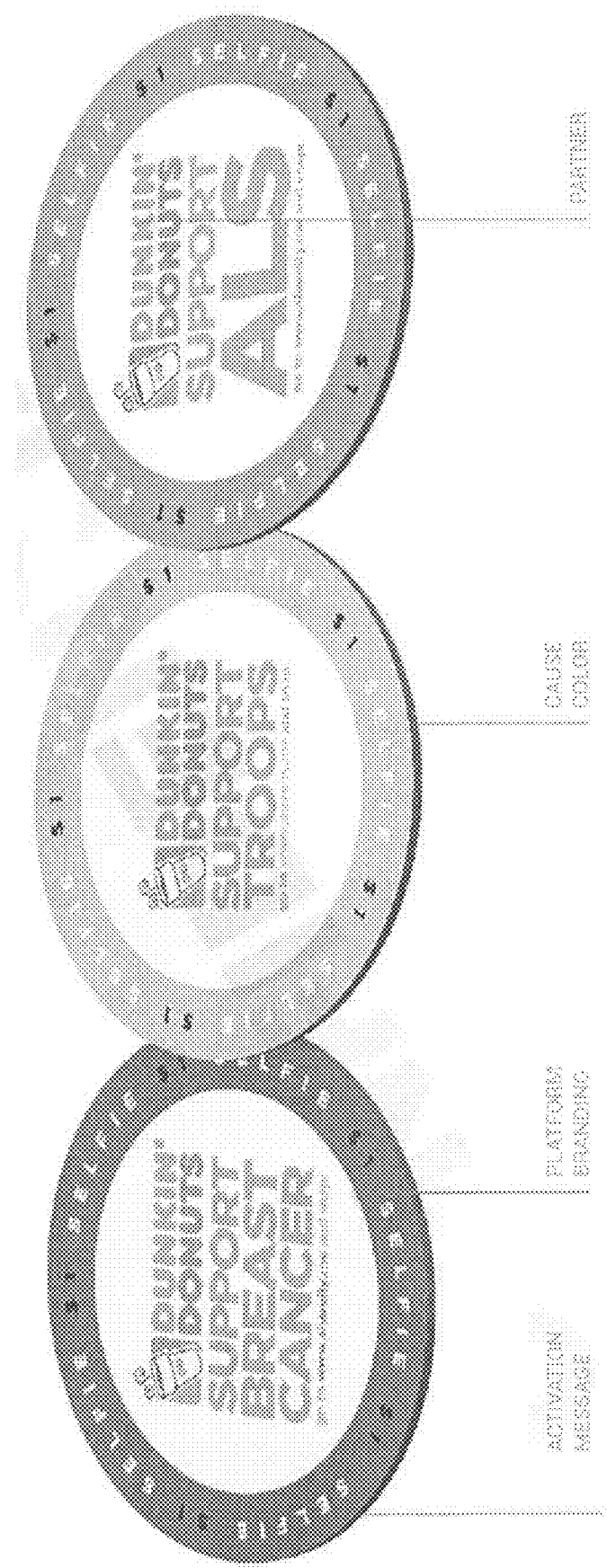
Figure 40:
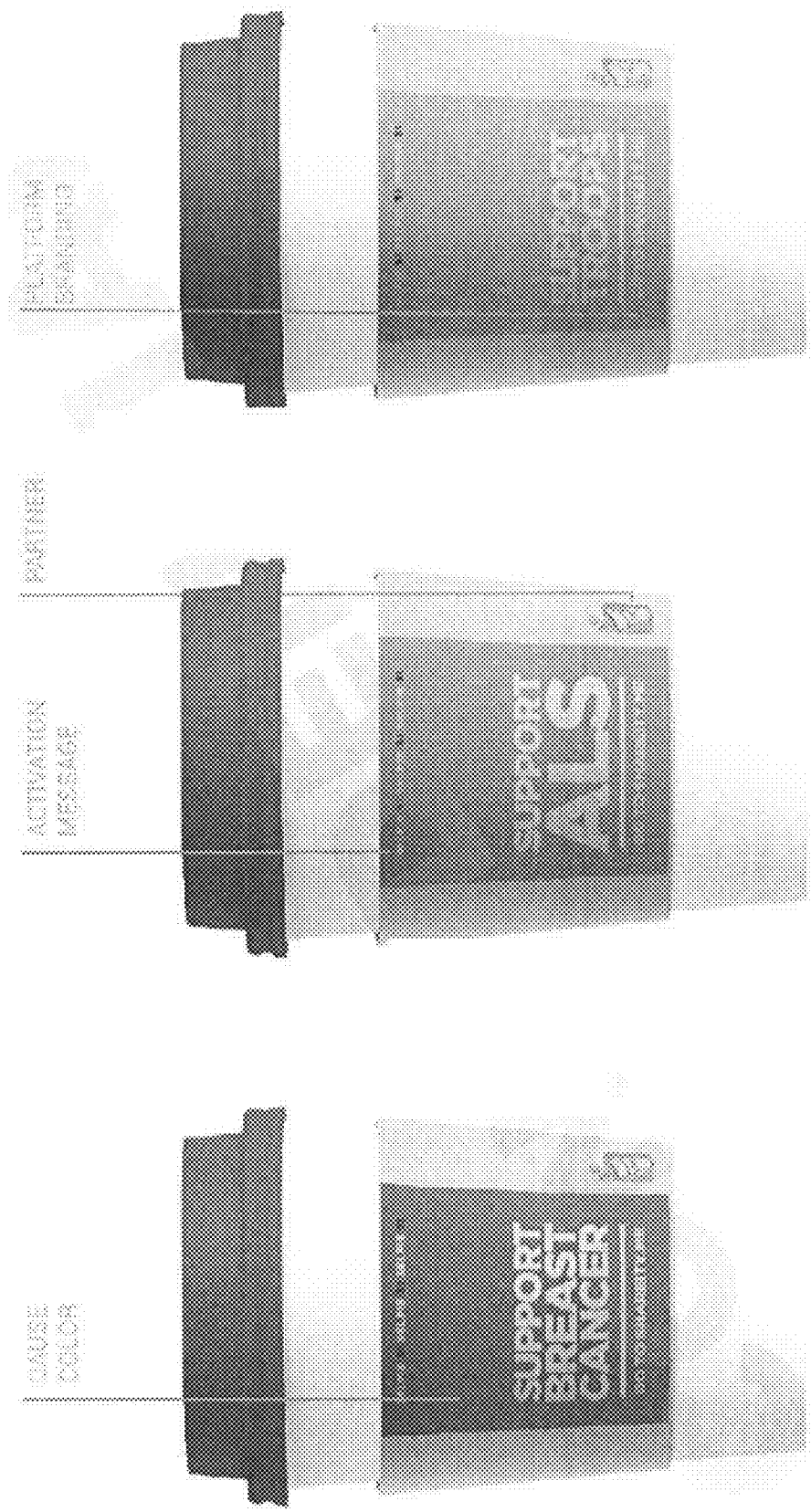

FIG. 37 shows an exemplary embodiment of a challenge. In the embodiment shown in FIG. 37, the challenge is to take a picture with a drink from the sponsor, the drink having a straw inserted in of a color indicative of the cause being supported (see FIG. 38). In other embodiments the drink is positioned on a coaster indicative of the cause being supported, as shown in FIG. 39. In yet another embodiment, the drink has a sleeve indicative of the cause being supported, as shown in FIG. 40. In this three exemplary embodiments, the sponsor contributes to the cause after the challenge is met.

The badge (the graphical activatable link), in one embodiment, is a tangible, marketable object. In that embodiment each copy of the graphical activatable link ("badge") is authenticated (in one instance the authentication is performed by creating an encrypted container file that includes all the copies of the graphical activatable link and each copy is assigned a unique identifier, such as a number; for instance, the encrypted container file can be created using "BitLocker" (see, for example, How to Create an Encrypted Container File With BitLocker on Windows, available at How to Geek, http://www.howtogeek.com/193013/how-to-create-an-encrypted-container-file-with-bitlocker-on-windows/, which is incorporated by reference herein in its entirety and for all purposes)—other types of authentication and encryption are also possible; authentication is also possible by code, via encrypted code, or by encrypted data (see, for example, Chapter 5 in Rafael Pass, Abhi Shelat, A COURSE IN CRYPTOGRAPHY, © 2010, a copy of which is incorporated by reference herein in its entirety and for all purposes). In that embodiment, "donation" refers to the payment for access to the graphical activatable link. The process for converting the graphical activatable link into a tangible marketable "object" includes the authentication each copy of the graphical activatable link. The process can also include the identification of each copy of the graphical activatable link with a different identifier for each copy. In these embodiments, a user can transfer the link to another user (the transfer can be for money or as a gift). Transfer of a copy of the graphical activatable link includes providing access to the link (where the link is authenticated by an encrypted container file, access includes access to that copy at the encrypted container file so that another user can display the copy of the graphical activatable link; where the link is authenticated by encrypted data, access includes access to the encrypted data). In one instance of this embodiment, activating the graphical activatable link can provide information about the graphical image related to the graphical activatable link—for example, but not limited to, who designed the image. In one exemplary embodiment, the graphical activatable link includes a copyrightable object. Some examples, these teachings not been limited only to those examples, of copyrightable objects are sketches, drawings, digitally constructed figures, animated figures, video images, images of a particular work. In one instance, not a limitation of these teachings, the image is an image of a work of art or a unique design. Since the graphical activatable link can be activated and displayed, the image can be displayed using display equipment such as projectors.

Another benefit of authentication is that it creates identification of the specific graphical activatable link. Since there is a record of the user that owns the specific graphical activatable link, the graphical activatable link can be used for identification.

The following is a disclosure by way of example of a device configured to execute functions (hereinafter referred to as computing device) which may be used with the presently disclosed subject matter. The description of the various components of a computing device is not intended to represent any particular architecture or manner of interconnecting the components. Other systems that have fewer or more components may also be used with the disclosed subject matter. A communication device may constitute a form of a computing device and may at least include a computing device. The computing device may include an inter-connect (e.g., bus and system core logic), which can interconnect such components of a computing device to a data processing device, such as a processor(s) or microprocessor(s), or other form of partly or completely programmable or pre-programmed device, e.g., hard wired and or application specific integrated circuit ("ASIC") customized logic circuitry, such as a controller or microcontroller, a digital signal processor, or any other form of device that can fetch instructions, operate on pre-loaded/pre-programmed instructions, and/or followed instructions found in hardwired or customized circuitry to carry out logic operations that, together, perform steps of and whole processes and functionalities as described in the present disclosure.

In this description, various functions, functionalities and/or operations may be described as being performed by or caused by software program code to simplify description. However, those skilled in the art will recognize what is meant by such expressions is that the functions result from execution of the program code/instructions by a computing device as described above, e.g., including a processor, such as a microprocessor, microcontroller, logic circuit or the like. Alternatively, or in combination, the functions and operations can be implemented using special purpose circuitry, with or without software instructions, such as using Application-Specific Integrated Circuit (ASIC) or Field-Programmable Gate Array (FPGA), which may be programmable, partly programmable or hard wired. The application specific integrated circuit ("ASIC") logic may be such as gate arrays or standard cells, or the like, implementing customized logic by metalization(s) interconnects of the base gate array ASIC architecture or selecting and providing metalization(s) interconnects between standard cell functional blocks included in a manufacturer's library of functional blocks, etc. Embodiments can thus be implemented using hardwired circuitry without program software code/instructions, or in combination with circuitry using programmed software code/instructions.

Thus, the techniques are limited neither to any specific combination of hardware circuitry and software, nor to any particular tangible source for the instructions executed by the data processor(s) within the computing device. While some embodiments can be implemented in fully functioning computers and computer systems, various embodiments are capable of being distributed as a computing device including, e.g., a variety of forms and capable of being applied regardless of the particular type of machine or tangible computer-readable media used to actually effect the performance of the functions and operations and/or the distribution of the performance of the functions, functionalities and/or operations.

The interconnect may connect the data processing device to define logic circuitry including memory. The interconnect may be internal to the data processing device, such as coupling a microprocessor to on-board cache memory or external (to the microprocessor) memory such as main memory, or a disk drive or external to the computing device, such as a remote memory, a disc farm or other mass storage device, etc. Commercially available microprocessors, one or more of which could be a computing device or part of a computing device, include a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc, or a 68xxx series microprocessor from Motorola Corporation as examples.

The inter-connect in addition to interconnecting such as microprocessor(s) and memory may also interconnect such elements to a display controller and display device, and/or to other peripheral devices such as input/output (I/O) devices, e.g., through an input/output controller(s). Typical I/O devices can include a mouse, a keyboard(s), a modem(s), a network interface(s), printers, scanners, video cameras and other devices which are well known in the art. The interconnect may include one or more buses connected to one another through various bridges, controllers and/or adapters. In one embodiment the I/O controller includes a USB (Universal Serial Bus) adapter for controlling USB peripherals, and/or an IEEE-1394 bus adapter for controlling IEEE-1394 peripherals.

The memory may include any tangible computer-readable media, which may include but are not limited to recordable and non-recordable type media such as volatile and non-volatile memory devices, such as volatile RAM (Random Access Memory), typically implemented as dynamic RAM (DRAM) which requires power continually in order to refresh or maintain the data in the memory, and non-volatile ROM (Read Only Memory), and other types of non-volatile memory, such as a hard drive, flash memory, detachable memory stick, etc. Non-volatile memory typically may include a magnetic hard drive, a magnetic optical drive, or an optical drive (e.g., a DVD RAM, a CD ROM, a DVD or a CD), or other type of memory system which maintains data even after power is removed from the system.

A server could be made up of one or more computing devices. Servers can be utilized, e.g., in a network to host a network database, compute necessary variables and information from information in the database(s), store and recover information from the database(s), track information and variables, provide interfaces for uploading and downloading information and variables, and/or sort or otherwise manipulate information and data from the database(s). In one embodiment a server can be used in conjunction with other computing devices positioned locally or remotely to perform certain calculations and other functions as may be mentioned in the present application.

At least some aspects of the disclosed subject matter can be embodied, at least in part, utilizing programmed software code/instructions. That is, the functions, functionalities and/or operations techniques may be carried out in a computing device or other data processing system in response to its processor, such as a microprocessor, executing sequences of instructions contained in a memory, such as ROM, volatile RAM, non-volatile memory, cache or a remote storage device. In general, the routines executed to implement the embodiments of the disclosed subject matter may be implemented as part of an operating system or a specific application, component, program, object, module or sequence of instructions usually referred to as "computer programs," or "software." The computer programs typically comprise instructions stored at various times in various tangible memory and storage devices in a computing device, such as in cache memory, main memory, internal or external disk drives, and other remote storage devices, such as a disc farm, and when read and executed by a processor(s) in the computing device, cause the computing device to perform a method(s), e.g., process and operation steps to execute an element(s) as part of some aspect(s) of the method(s) of the disclosed subject matter.

A tangible machine readable medium can be used to store software and data that, when executed by a computing device, causes the computing device to perform a method(s) as may be recited in one or more accompanying claims defining the disclosed subject matter. The tangible machine readable medium may include storage of the executable software program code/instructions and data in various tangible locations, including for example ROM, volatile RAM, non-volatile memory and/or cache. Portions of this program software code/instructions and/or data may be stored in any one of these storage devices. Further, the program software code/instructions can be obtained from remote storage, including, e.g., through centralized servers or peer to peer networks and the like. Different portions of the software program code/instructions and data can be obtained at different times and in different communication sessions or in a same communication session.

The software program code/instructions and data can be obtained in their entirety prior to the execution of a respective software application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a single machine readable medium in entirety at any particular instance of time.

In general, a tangible machine readable medium includes any tangible mechanism that provides (i.e., stores) information in a form accessible by a machine (i.e., a computing device, which may be included, e.g., in a communication device, a network device, a personal digital assistant, a mobile communication device, whether or not able to download and run applications from the communication network, such as the Internet, e.g., an I-phone, Blackberry, Droid or the like, a manufacturing tool, or any other device including a computing device, comprising one or more data processors, etc.

Although these teachings has been described with respect to various embodiments, it should be realized these teachings are also capable of a wide variety of further and other embodiments within the spirit and scope of the appended claims.

What is claimed is:

1. A system for providing a graphical activatable link related to an activity comprises:
    a handheld mobile communication device;
    a web site server configured to receive information from the handheld mobile communication device; and
    wherein the handheld mobile communication device and the web site server comprise one or more processors;
        the one or more processors being configured to:
        select an activity from an activity list, the activity list being presented in a graphical user interface by the handheld mobile communication device;
        respond to a challenge related to the activity using in the handheld mobile communication device;
        a response to the challenge comprising providing a photo or providing a video;
        verify that the response to the challenge has been made by communicating between the handheld mobile communication device and the web site server;
        provide, after verifying that the response to the challenge has been made, the graphical activatable link related to the activity to a profile corresponding to a person responding to the challenge;
        obtain a count of a number of accesses to the graphical activatable link;
        relate the count of the number of accesses to the graphical activatable link to a number of referrals; and
        obtain a score, the score comprising a number of times the graphical activatable link has been shared and in which party shared with responds to the challenge
        the party responding to a challenge is a similar act to said person responding to the challenge;
        wherein the score corresponds to a count of actions of returning of similar acts.

2. The system of claim 1 wherein the one or more processors are also configured to authenticate the graphical activatable link.

3. The system of claim 1 wherein authentication is performed by creating an encrypted container file.

4. The system of claim 1 wherein authentication is performed using authentication code.

5. The system of claim 1 wherein the one or more processors are also configured to provide, after verifying that the response to the challenge has been made, access of the person responding to the challenge to a community of users who have responded to the challenge related to the activity; and,
    wherein the access to said community of users comprises access to an animation, the animation being representative of the activity.

6. The system of claim 5 wherein the animation comprises a pulsating lighted object.

7. The system of claim 1 wherein the one or more processors are also configured to receive, from another entity, a monetary donation when any user responds to the challenge.

8. The system of claim 7 wherein the one or more processors are also configured to send an announcement to a user, from said another entity, when the user responds to the challenge.

9. A method for providing a graphical activatable link related to an activity, the method comprising:

selecting the activity from an activity list, the activity list being presented by an application in a handheld mobile communication device;

responding to a challenge related to the activity using the handheld mobile communication device; a response to the challenge comprising providing a photo or providing a video;

communicating between the handheld mobile communication device and a web site server in order to verify that the response to the challenge has been made;

providing, after verifying that the response to the challenge has been made, the graphical activatable link related to the activity to a profile corresponding to a person making the response to the challenge;

obtaining a count of a number of accesses to the graphical activatable link;

relating the count of the number of accesses to the graphical activatable link to a number of referrals; and obtaining a score, the score comprising a number of times the graphical activatable link has been shared and in which party shared with responds to the challenge;

the party responding to a challenge is a similar act to said person responding to the challenge;

wherein the score corresponds to a count of actions of returning of similar acts.

10. The method of claim 9 wherein the graphical activatable link is authenticated.

11. The method of claim 10 wherein an activity site is configured to authenticate the graphical activatable link.

12. The method of claim 10 wherein authentication is performed by creating an encrypted container file.

13. The method of claim 10 wherein authentication is performed using authentication code.

14. The method of claim 9 wherein the method also comprises:

providing, after verifying that the response to the challenge has been made, access to the person responding to the challenge to a community of users who have responded to the challenge related to the activity; and providing to the person making the response to the challenge, after receiving the access to said community of users, access to an animation, the animation being representative of the activity.

15. The method of claim 14 wherein the animation comprises a pulsating lighted object.

16. The method of claim 9 wherein another entity provides a monetary donation when a user responds to the challenge.

17. The method of claim 16 further comprising providing, to the person responding to the challenge, an announcement from the another entity.

18. The system of claim 7 wherein the challenge comprises at least one of taking a photo of the a user with a drink from the another entity, referred to as a sponsor, the drink having a straw inserted in of a color indicative of the cause being supported, taking a photo of the user with a drink from the sponsor, the drink being positioned on a coaster indicative of the cause being supported, or taking a photo of the user with a drink from the sponsor, the drink having a sleeve indicative of cause being supported.

19. The method of claim 16 wherein the challenge comprises at least one of taking a photo of the a user with a drink from the another entity, referred to as a sponsor, the drink having a straw inserted in of a color indicative of the cause being supported, taking a photo of the user with a drink from the sponsor, the drink being positioned on a coaster indicative of the cause being supported, or taking a photo of the user with a drink from the sponsor, the drink having a sleeve indicative of cause being supported.

20. The system of claim 1 wherein the web site server is also configured to process an exchange corresponding to a donation; and, wherein the score also comprises a monetary impact of actions performed.

21. The system of claim 1 wherein the score also comprises a monetary impact of actions performed.

22. The method of claim 9 wherein the score also comprises a monetary impact of actions performed.

* * * * *